United States Patent
Cremon et al.

(10) Patent No.: US 10,616,585 B2
(45) Date of Patent: Apr. 7, 2020

(54) ENCODING DATA ARRAYS

(71) Applicant: Arm Limited, Cambridge (GB)

(72) Inventors: Jonas Christensson Cremon, Lund (SE); Hui Chen, Cambridge (GB); Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/820,843

(22) Filed: Nov. 22, 2017

(65) Prior Publication Data

US 2019/0158847 A1 May 23, 2019

(51) Int. Cl.
| | |
|---|---|
| H04N 19/146 | (2014.01) |
| H04N 19/139 | (2014.01) |
| H04N 19/184 | (2014.01) |
| H04N 19/192 | (2014.01) |
| H04N 19/149 | (2014.01) |
| H04N 19/103 | (2014.01) |
| H04N 19/174 | (2014.01) |
| H04N 19/124 | (2014.01) |

(52) U.S. Cl.
CPC ......... *H04N 19/146* (2014.11); *H04N 19/103* (2014.11); *H04N 19/139* (2014.11); *H04N 19/149* (2014.11); *H04N 19/174* (2014.11); *H04N 19/184* (2014.11); *H04N 19/192* (2014.11); *H04N 19/124* (2014.11)

(58) Field of Classification Search
None
See application file for complete search history.

(56) References Cited

U.S. PATENT DOCUMENTS

| | | | |
|---|---|---|---|
| 5,802,213 A | * | 9/1998 | Gardos ............... H04N 19/176 375/240.03 |
| 6,222,881 B1 | | 4/2001 | Walker |
| 2002/0085634 A1 | * | 7/2002 | Morel ................. H04N 19/172 375/240.03 |
| 2012/0307890 A1 | | 12/2012 | Lu |

(Continued)

FOREIGN PATENT DOCUMENTS

GB 2471887 11/2014

OTHER PUBLICATIONS

Jiang et al. "Low-delay Rate Control for Real-Time H.264/AVC Video Coding", IEEE Transactions on Multimedia, vol. 8, Issue 3, Jun. 2006.*

(Continued)

*Primary Examiner* — Edemio Navas, Jr.
(74) *Attorney, Agent, or Firm* — Vierra Magen Marcus LLP

(57) ABSTRACT

When encoding an array of data elements of a stream of arrays of data elements, a number of bits used in the output bitstream to encode a previous array of data elements in the stream of arrays of data elements is estimated based on an amount of intermediate data generated for that previous array of data elements by the encoding process. A value of an encoding parameter to use when encoding the array of data elements being encoded is then selected based on the estimated number of bits used in the output bitstream to encode the previous array of data elements and a target output bit rate for the output bitstream produced when encoding the stream of arrays of data elements.

21 Claims, 7 Drawing Sheets

(56) References Cited

U.S. PATENT DOCUMENTS

2013/0301739 A1 11/2013 Sato
2014/0341276 A1 11/2014 Lee
2015/0237346 A1 8/2015 Symes

OTHER PUBLICATIONS

Azevedo et al., "Parallel H.264 Decoding on an Embedded Multicore Processor", High Performance Embedded Architectures and Compilers: Fourth International Conference, HIPEAC 2009, Paphos, Cyprus, Jan. 25-28, 2009, Proceedings.*

GB Search Report for GB No. 1402934.2, dated Aug. 6, 2014, 3 pages.

Akramullah, S.M. et al., "A Data-parallel Approach for Real-Time MPEG-2 Video Encoding", Journal of Parallel and Distributed Computing, vol. 30, pp. 129-146, (1995), 18 pages.

Bozoki, S. et al., "Scene Adaptive Rate Control in a Distributed parallel MGEG Video Encoder", pp. 780-783, IEEE, (1997), 4 pages.

Hsu, C-Y., "Rate Control for Video Transmission Over Variable Rate Channels", A Dissertation Presented to the Faculty of the Graduate School, University of Southern California, (Aug. 1998), 132 pages.

Jiang, M. et al., "Low-Delay Rate Control for Real-Time H.264/AVC Video Coding", IEEE Transactions on Multimedia, pp. 467-477, vol. 8, No. 3, (Jun. 2006), 11 pages.

Rodriguez, A. et al., "Hierarchiacal Parallelization of an H.264/AVC Video Encoder", Proceedings of the International Sypmosium on Parallel Computing in Electrical Engineering (PARELEC'06), (2006), 6 pages.

* cited by examiner

ENCODING DATA ARRAYS

BACKGROUND

The technology described herein relates to a method of and apparatus for encoding data arrays, and in particular for encoding streams of data arrays, such as in the case of encoding frames of video data, e.g., for display.

It is common to encode a stream of arrays of data elements, such as arrays of image data values (e.g. frames of video for display), so as to compress the data in order to reduce bandwidth and memory consumption. This is particularly desirable in data processing apparatus, e.g. portable devices, where processing resources and power may be limited.

Many, e.g. video, encoding processes use a two-step process when encoding arrays of data elements, such as input images: a first step to process the input images to generate a set of intermediate data representing the input images; and then a second step of encoding (e.g. entropy encoding) the intermediate data to provide an output set of data (bitstream) representing the input data arrays in an encoded form.

FIG. 1 illustrates this process, and shows input data arrays (e.g. images (pictures)) 1 to be encoded being subject first to a data element (e.g. pixel) processing step 2, to generate "intermediate data" 3 representing the input images, followed by an "entropy encoding" step 4 which encodes the intermediate data 3 to provide an output bitstream 5 that represents the input data arrays (e.g. pictures) in an encoded (e.g. compressed) form.

The first, data elements (pixel) processing step 2 of such encoding methods typically divides each array of data elements (e.g. image) to be encoded into plural smaller "source" blocks of data elements, and processes the array on a block-by-block basis. For each source block of data elements being considered, typically a corresponding "reference" block of data elements (which may be a predicted block of data elements) that is derived from one or more arrays of the stream of data arrays is determined, and then a set of difference values representative of the difference between the source block and the determined "reference" block of data elements is determined.

The reference (predicted) block may be another block within the same data array (i.e. using "intra" mode encoding), or it may be a block formed for one or other data arrays of the sequence of data arrays (i.e. using "inter" mode encoding). A "motion estimation" process may be used to search within one or more reference frames for one or more suitable candidate reference blocks to consider when encoding a source block. The reference block used for a "source" block being encoded is typically indicated to the decoder by using a motion vector that describes how the source block is mapped (e.g. by translation, rotation and/or scaling) to the reference block.

As well as determining a reference (predicted) block to use when encoding a block of a data array (and the corresponding motion vector(s) defining that reference block), the data element processing step 2 will also then determine the differences between the (source) block of the data array being encoded and its respective determined reference (predicted) block, so as to provide a set of difference values (residuals) representative of the difference between the source block being encoded and its corresponding "reference" block of data elements.

A transformation, such as a forward discrete cosine transformation process, is then typically applied to the set of difference values (residuals) to generate a set of frequency domain coefficients representing the differences (residuals) in the frequency domain. A quantization process is typically then applied to the set of frequency domain coefficients to generate a set of quantized frequency domain coefficients.

Thus, the data element (e.g. pixel) processing step 2 will typically generate for a block of a data array being encoded, motion vector information defining a reference block for the block being encoded, and a set of difference values (residuals) information, typically in the form of a set of quantized frequency domain coefficients. This information is then provided as the intermediate data 3 that is then subjected to the encoding (to the entropy encoding) 4 when generating the output (encoded) bitstream 5 representing the input data array.

This is (usually) done for each block that a data array being encoded is being divided into, so there will be a respective set of intermediate data comprising, e.g., and in an embodiment, motion vector information, and difference value (residuals) information (e.g., and in an embodiment, in the form of a set of quantized frequency domain coefficients), for each block that a given data array has been divided into for encoding purposes.

(The particular encoding options to use when encoding an array may be calculated by calculating cost values for various different sets of encoding options for a region of the array, and then selecting one or more particular sets of encoding options to use when encoding that region of the array that have an acceptably low cost value, e.g. using a so-called "rate distortion optimisation" (RDO) process. Such an RDO process may be performed as part of the data element (pixel) processing 2, with the intermediate data 3 that is generated by that step then comprising the intermediate data generated for the particular encoding option that is selected for the regions and blocks of the data array.)

As shown in FIG. 1, the intermediate data that is generated for the blocks of a data array (and for data arrays of a stream of data arrays) is subjected to an encoding process 4, which is typically an entropy encoding process, to provide an output bitstream 5 representing the input data arrays in an encoded (and, e.g., compressed) form. The output bitstream 5 may, e.g., be written out to memory and/or transmitted, e.g. for subsequent decoding and output, e.g. for display.

One important aspect of a data array, e.g. video, encoding process of the type illustrated in FIG. 1, particularly in the case of real-time, e.g., video encoding, particularly in the case of lower powered and/or portable devices, is often to provide the output bitstream 5 at a particular target output bit rate (e.g. number of bits per second). Typically, the encoder will try to maximise visual quality while keeping a target number of bits per second. This is commonly referred to as "rate control".

In order to achieve this, the, e.g., video, encoder, will typically vary an aspect or aspects of the intermediate data generation by the data element (pixel) processing 2 so as to affect the number of output bits that will be generated for the output bitstream 5. Typically this is done by varying some form of "quality" parameter of the data elements (pixel) processing 2, such as a quantization parameter that is applied to the set of frequency domain coefficients when generating the set of quantized frequency domain coefficients representing the difference values (residuals) for a given block of a data array being encoded.

In the case where a sequence of data arrays (e.g. video frames) is being encoded "offline", then such rate control could be achieved simply by, if necessary, re-processing a and each data array (e.g. video frame) a number of times, until the desired number of bits per frame is achieved.

However, in the case of "real-time" encoding, for example, it may not be possible to process a data array multiple times in order to facilitate good rate control. In this case, the rate control operation could be based, e.g., on the known number of bits that have been produced when encoding earlier data arrays (e.g. frames) in the sequence of data arrays being encoded, but that information may not always be readily or immediately available (or completely up-to-date), e.g. particularly in the case where the encoding process is distributed across a number of parallel processors (which may be desirable for speed, throughput and/or power consumption purposes).

The Applicants believe therefore that there remains scope for improvements to the output bit rate control operation when encoding sequences of data arrays, particularly in the case of real-time and/or distributed encoding of sequences of data arrays.

BRIEF DESCRIPTION OF THE DRAWINGS

Various embodiments of the technology described herein will now be described by way of example only and with reference to the accompanying drawings, in which.

DETAILED DESCRIPTION

A first embodiment of the technology described herein comprises a method of encoding arrays of data elements of a stream of arrays of data elements, in which each array of data elements is encoded by generating a set of intermediate data representing the array of data elements and then encoding the set of intermediate data to provide an output bitstream representing the array of data elements in an encoded form, the method comprising:

when encoding an array of data elements to be encoded of a stream of arrays of data elements:

estimating a number of bits used in the output bitstream to encode a previous array of data elements in the stream of arrays of data elements being encoded, based on an amount of intermediate data generated for that previous array of data elements by the encoding process;

selecting a value of an encoding parameter to use when encoding the array of data elements to be encoded based on the estimated number of bits used in the output bitstream to encode the previous array of data elements and a target output bit rate for the output bitstream produced when encoding the stream of arrays of data elements; and encoding the array of data elements to be encoded using the selected value of the encoding parameter.

A second embodiment of the technology described herein comprises an apparatus for encoding arrays of data elements of a stream of arrays of data elements, the apparatus comprising:

encoding circuitry operable to encode an array of data elements by generating a set of intermediate data representing the array of data elements, and then encoding the set of intermediate data to provide an output bitstream representing the array of data elements in an encoded form;

the apparatus further comprising output bitstream rate control circuitry comprising:

bit number estimating circuitry operable to estimate a number of bits used in an output bitstream to encode a previous array of data elements in a stream of arrays of data elements being encoded, based on an amount of intermediate data generated for that previous array of data elements by the encoding circuitry;

and encoding parameter selecting circuitry operable to:

select a value of an encoding parameter to use when encoding an array of data elements to be encoded based on an estimated number of bits used in the output bitstream to encode a previous array of data elements estimated by the bit number estimating circuitry and a target output bit rate for an output bitstream produced when encoding a stream of arrays of data elements; and to cause the encoding circuitry to encode an array of data elements to be encoded using the selected value of the encoding parameter.

Figure 1:
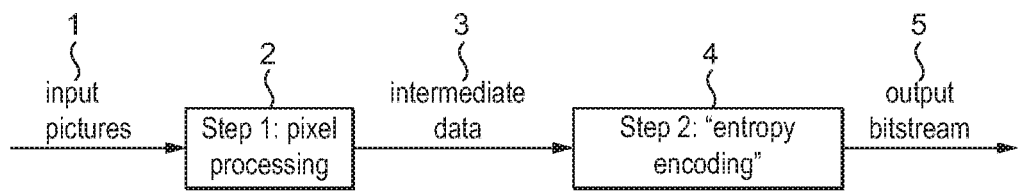
FIG. 1 shows a process for encoding a stream of data arrays.

The technology described herein relates to, e.g., video, encoding processes that generate sets of intermediate data representing arrays of data elements to be encoded, which intermediate data is then encoded to provide an output bitstream representing the arrays of data elements in an encoded form (i.e. of the type illustrated in FIG. 1).

However, in the technology described herein, the value of an encoding parameter to use when encoding an array of data elements (such as, e.g., and in an embodiment, of an appropriate "quality" affecting parameter, such as a quantization parameter) is selected based on a number of bits that have been used in the output bitstream to encode a previous data array that is estimated from an amount of intermediate data generated for that previous data array (and a desired target output bit rate). In other words, as part of the output bitstream "rate control" process, the technology described herein uses an estimate of the number of bits used to encode a previous data array that is based on an amount of intermediate data produced for that previous data array.

As will be discussed further below, the Applicants have found that a reasonable estimate of the number of bits that was used to encode a data array can be made based on an amount of intermediate data that was produced for that data array as part of the encoding process. Such bit estimates can then be used in the rate control process for more recent data arrays in a sequence of data arrays for which, e.g., the encoding may not have been completed (such that an actual number of bits used to encode the data array may not yet be available).

This can then provide an enhanced rate control operation, as it can allow the rate control process to take account of more recent data arrays, even when, e.g., the actual number of bits used for the more recent data arrays is not yet known (such as may, e.g., particularly be the case where the encoding process is being performed in a distributed manner).

This can then allow the rate control operation to, e.g., adapt more quickly to (dynamic) changes in a sequence of data arrays being encoded than in arrangements, e.g., in which only completed encoded data arrays (for which an actual output number of bits is known) are considered.

The technology described herein can accordingly provide an improved output bit rate control operation and apparatus as compared to existing arrangements.

The array and arrays of data elements that are being encoded in the technology described herein can be any suitable and desired arrays of data elements that can be encoded. Each array of data elements will comprise a plurality of data elements, each having a respective data position within the array, and having a particular data value or values for that position in the array. The arrays of data elements can be any desired and suitable size or shape in terms of the number of data elements and/or data positions, but are in an embodiment rectangular (including square).

The data values for the arrays of data elements may correspondingly have any desired and suitable format, for example that represent image data values (e.g. colour values). In an embodiment, the data arrays store data using YUV or RGB formats.

In an embodiment the (and each) array of data elements that is being encoded represents an image, such as, and in an embodiment, a frame of a video (a sequence of images) to be displayed. Other arrangements would, of course, be possible.

Correspondingly, the stream of arrays of data elements in an embodiment comprises a stream (a sequence) of images, such as, and in an embodiment, a stream (a sequence) of video frames to be encoded (with the arrays of data elements correspondingly in an embodiment comprising respective video frames (images) of the stream of video frames to be encoded).

As discussed above, the technology described herein is believed to be particularly applicable to the "real-time" encoding of streams of arrays of data elements. Thus, in an embodiment, the stream of arrays of data elements comprises a "real-time" stream of arrays of data elements, e.g. video frames, such as a stream of data arrays (e.g. frames) at a rate of 30 or 60 data arrays (frames) per second. Correspondingly, the encoded output bitstream representing the stream of arrays of data elements is in an embodiment such that a decoder can reproduce a stream of arrays of data elements in a "real-time" manner, i.e. so as to output decoded data arrays (e.g. frames) at a rate of, e.g., 30 or 60 data arrays (e.g. frames) per second.

Other arrangements would, of course, be possible.

In any of the embodiments described herein, the arrays of data elements may be provided in any desired and suitable way. Embodiments may comprise first generating the data arrays that are to be encoded, receiving the data arrays that are to be encoded from a processing unit (processor) that is generating the data arrays, and/or reading the data arrays, e.g. from memory.

The data arrays may be generated in any desired and suitable way. In embodiments, the data arrays may be generated, e.g. by a, e.g. video, camera (e.g. an image signal processor of a (video) camera). In other embodiments, the data arrays may be generated by a graphics processor (a graphics processing pipeline) or a CPU (central processing unit). Other arrangements would, of course, be possible.

The arrays of data elements may be encoded in the technology described herein using any suitable and desired encoding process that first generates a set of intermediate data representing an array of data elements to be encoded, and then encodes the set of intermediate data to provide an output bitstream representing the array of data elements in an encoded form. Any suitable encoding, e.g. video encoding, process that operates in this manner can be used, such as the HEVC video encoding scheme (standard).

The intermediate data that is generated for an array of data elements being encoded can correspondingly be any suitable and desired set of intermediate data that can be generated by an encoding process, and may, e.g., and in an embodiment, depend upon the particular encoding scheme (e.g. standard) that is being used.

In an embodiment, the encoding process is a process that encodes data arrays by dividing a data array into (plural) blocks of data elements, and then determine the differences (residuals) between the blocks of data elements and respective reference blocks of data elements.

In this case therefore, the encoding of a (and the) array of data elements may, and in an embodiment does, comprise, dividing the array into a plurality of blocks of data elements, and for a (and each) block: generating an array of difference values that represents the differences between the block and a reference block, generating an array of frequency domain coefficients for the array of difference values by applying a (e.g. Discrete Cosine Transform (DCT)) forward transformation process to the array of difference values, and/or generating an array of quantised coefficients by applying a quantisation process to the array of frequency domain coefficients.

The encoding process may be, and is in an embodiment, preceded by a process of selecting a set of encoding options to use when encoding the array of data elements, e.g. and, in an embodiment that uses an appropriate rate distortion optimisation (RDO) process, that, e.g., and in an embodiment, uses estimates of encoding bit costs, and/or distortion values, to select which one(s) of a plurality of different sets of encoding options to use when encoding the data array.

Other arrangements would, of course, be possible.

Thus, in an embodiment, the set of intermediate data that is generated for a data array in the technology described herein comprises data, such as, and in an embodiment, motion vector information and/or other prediction information, that allows a reference block for a given block of data elements of the data array being encoded to be determined, and difference (residuals) data that allows a set of difference values representative of the differences between the block of data elements being encoded and the determined reference block to be determined. In an embodiment, the "difference value" intermediate data is in the form of a set of quantized frequency domain coefficients. Other arrangements would, of course, be possible.

Thus, in an embodiment, the set of intermediate data representing an array of data elements being encoded comprises motion vector information and difference value (residuals) information (e.g., and in an embodiment, in the form of a set of quantized frequency domain coefficients), for each of plural blocks of data elements that the data array being encoded has been divided into for the encoding process.

The intermediate data that is generated for an array of data elements may be encoded to provide the output bitstream representing the array of data elements in an encoded form in any suitable and desired manner. This may again, and does in an embodiment, depend upon the particular encoding scheme (e.g. standard) that is being used. In an embodiment, the set of intermediate data is subjected to an entropy encoding process to provide the output bitstream representing the array of data elements in an encoded form.

As discussed above, the technology described herein is particularly concerned with the process of so-called "rate control" that is used in many data array encoding processes so as to try to achieve a particular bit rate for an output bitstream representing a stream of arrays of data elements that are being encoded.

In the technology described herein, such "rate control" is performed using an estimated number of bits used in the output bitstream to encode a previous array of data elements, together with a target output bit rate for the output bitstream produced when encoding the stream of arrays of data elements, to then select a value of an encoding parameter to use when encoding an array or arrays of data elements of the stream of arrays of data elements.

The target output bit rate can be defined in any appropriate and desired manner, and may, e.g., be fixed for the entire encoding process (e.g. for the sequence of data arrays in question), or may be variable in use.

In one embodiment, the rate control process (the rate controller) uses a "buffer" (a "leaky bucket") rate control model where the encoded output bits are, in effect, placed in a buffer which is then "drained" (emptied) by a certain number of bits per second (at a certain bit rate) (e.g. to storage (memory) or by being transported, e.g. across a network, to a remote, e.g. decoder). In this case, the rate control process will operate to (try to) ensure that the buffer doesn't overflow, and so the target output bit rate may be, and is in an embodiment, the bit rate at which the buffer (bucket) is being "drained" (emptied).

Alternatively, the target output bit rate could comprise a target output bit rate for the output bitstream to be produced when encoding the stream of arrays of data elements, such as an average bit rate over (for) a number of data arrays in the sequence of data arrays being encoded, such as an average output bit rate to be achieved for a sequence of a given number of data arrays. Thus, the target output bit rate may be a bit rate to be achieved over a particular, in an embodiment selected, time period when encoding the stream of arrays of data elements, such as an average bit rate per second.

Other arrangements would, of course, be possible.

As well as the target output bit rate, the technology described herein also uses an estimate of the number of bits used in the output bitstream that is based on an amount of intermediate data generated for a previous array of data elements for the rate control process.

It will be appreciated in this regard that the data arrays in the stream of data arrays will be encoded one after another (although some data arrays may be encoded in parallel with each other), and so references herein to a previously encoded data array refer to a data array for which at least some encoding has been performed when the current data array that is being considered is being encoded. While it may typically be the case that the encoding order (sequence) of the data arrays is the same as their order in the stream of data arrays (e.g. as they are being generated and/or are to be displayed), that need not be the case, for example where data arrays (e.g. video frames) that are later in a stream are encoded first, e.g. so as to provide reference data arrays for earlier data arrays in the stream order.

The previously encoded data array for which the amount of bits in the output bitstream is estimated can comprise any previous data array in the encoding sequence for which at least some intermediate data has been generated (and, e.g., and in an embodiment, for which the actual number of bits used in the output bitstream is not (yet) known).

This could comprise for example, and in one embodiment is a (e.g. the closest (in the encoding order)) previous data array for which the entire set of intermediate data has been generated when encoding that previous data array, and/or, as will be discussed further below, it could be a previous (e.g. the closest) data array for which only part (only some) but not all of the intermediate data has been generated when encoding that previous data array (and in an embodiment this is the case).

In an embodiment, an amount of bits in the output bitstream is estimated (at least) for the closest (in the encoding sequence) previously encoded data array to the data array that is currently being encoded for which an amount of intermediate data generated when encoding that previous data array is known.

In an embodiment, the previous data array for which the amount of bits in the output bitstream is estimated comprises the immediately preceding array in the encoding sequence (at least in the case where an amount of intermediate data for that immediately preceding data array has already been generated when the estimate is required).

It would be possible to use an estimate for only one previous data array, but in an embodiment, estimates are determined and used for more than one previously encoded data array, e.g. for a sequence of (in an embodiment adjacent) previously encoded data arrays. In this case, estimates may be, and are in an embodiment determined for each previous data array in the encoding sequence of the data arrays for which at least some intermediate data has been generated, but for which an actual output number of bits is not yet known.

The number of bits used in the output bitstream to encode a previous array of data elements can be estimated based on an amount of intermediate data generated for that previous array of data elements by the encoding process in any suitable and desired manner.

The amount of intermediate data generated for a previous data array can be assessed and defined for this purpose in any suitable and desired manner. It is in an embodiment based on the intermediate data elements that have been generated for the previous data array, such as the motion vectors and/or differences (residuals) data elements (e.g. quantized frequency domain coefficients) that have been generated for the previous data array. For example, it could be based on the number of intermediate data elements that have been generated, the type of intermediate data elements that have been generated, and/or the (actual) values of the intermediate data elements that have been generated, for the data array.

In an embodiment, a particular, in an embodiment selected, in an embodiment predetermined, function or functions that relates the amount of intermediate data to a number of bits that would be used in the output bitstream to encode that amount of intermediate data is used for this purpose. For example, there could be a function that models the number of bits needed to encode motion vector and/or other prediction information based on the number and/or values of the motion vectors and/or prediction information. Correspondingly the function or an additional function could model the number of bits needed to encode the differences (residuals) information, e.g. as a function of the residuals quantized frequency domain coefficients.

The function or functions may be based, e.g., on an analysis of the encoding of multiple arrays of data elements so as to identify and determine an appropriate function relating the amount of intermediate data to the number of bits that will be in the output bitstream for encoding that amount of intermediate data. Such a relationship may be determined, for example, by offline bench-marking of arrays of data elements.

In an embodiment, the function relating the amount of intermediate data to the number of bits that is used is a non-linear function, and in an embodiment a fixed, non-linear function.

The value of the encoding parameter to use when encoding the array of data elements could be selected based on the estimated number of bits used in the output bitstream for only one (a single) previously encoded array of data elements, but in an embodiment, the value of the encoding parameter is selected based on an estimated number of bits used in the output bitstream for plural previous encoded arrays of data elements.

Correspondingly, the value of the encoding parameter to use when encoding the array of data elements could be based (only) on estimated numbers of bits used in the output bitstream for a (or plural) previously encoded arrays of data elements, but in an embodiment is also based on an actual number of bits used in the output bitstream for at least one, and in an embodiment for plural, previously encoded arrays of data elements. In this case therefore the encoding parameter value will be selected based both on estimated numbers of bits used in the output bitstream for encoding previously encoded arrays of data elements, and one or more actual numbers of bits used for encoding previously encoded arrays of data elements in the output bitstream.

In an embodiment, the encoding parameter value is selected based on estimated and/or actual (where available) numbers of bits for a particular, in an embodiment selected, in an embodiment predetermined, number of previously encoded data arrays, such as, and in an embodiment, the immediately preceding 1 to 10, in an embodiment 1 to 6 (or fewer) data arrays in the encoding sequence.

The process of selecting the value of the encoding parameter to use can use the target output bit rate and the estimated (and, e.g., actual) number of bits used in the output bitstream for a previously encoded array or arrays of data elements in any suitable and desired manner.

For example, when using the "buffer" ("leaky bucket") model rate control arrangement as discussed above, the rate controller could be operable to keep track of the current "position" (the current "fill level") in the buffer based on the estimated (and, e.g., actual) number of bits used in the output bitstream for a previously encoded array or arrays of data elements, and then select the value of the encoding parameter to use for the data array that is being encoded so as to (try to) achieve a number of output bits for the data array currently being encoded that will ensure that the buffer does not "overflow" based on the current position ("fill level") of the buffer and the target output bit rate at which the data is being removed (drained) from the buffer.

Alternatively, the rate control process (the rate controller) could determine the current average output bit rate for a preceding sequence of data arrays based on estimated (and e.g. actual) number of bits used in the output bitstream for those data arrays and compare that to a desired target output bit rate, and then select the value of the encoding parameter to use for the current data array being encoded accordingly (e.g. to (try to) achieve a number of output bits for the data array currently being encoded that will converge the current output bit rate that the encoding process is achieving towards or keep it at the target output bit rate).

It should be noted here that the rate control operation will in general, and in an embodiment does, operate to set the value of the encoding parameter so as to achieve a desired number of output bits for a (and the) data array being encoded (e.g. for the frame in question), but that desired number of bits (and the selecting of the value of the encoding parameter to use) need not necessarily be the same as or be intended to achieve the particular average number of bits (bit rate) for the data array in question. Thus the rate control process need not, and in an embodiment does not, try to keep every data array to the same number of output bits, but can allow different data arrays to have different numbers of output bits (if desired), e.g. for visual quality reasons where the data arrays are images, so long as the appropriate target output bit rate requirement is achieved (e.g. to avoid the output buffer overflowing).

Other arrangements would, of course, be possible.

The encoding parameter value to use can be selected based on the estimated (and the actual) number of bits used in the output bitstream to encode a previous array or arrays of data elements and the target output bit rate at any desired and suitable stage of the encoding process. Correspondingly, the selected encoding parameter value can be used for encoding as much of a data array and/or for as many data arrays, in the stream of data arrays being encoded, as desired.

In an embodiment, the encoding parameter value is in an embodiment selected at least at (and in one embodiment at) the beginning of encoding a (new) data array. In such an arrangement, the selected encoding parameter value may then be, and in an embodiment is, used for encoding the data array in question.

In an embodiment, a new encoding parameter value is determined once per data array, and in an embodiment (once) for each data array that is to be encoded (e.g., and in an embodiment, at the beginning of encoding of each data array in the stream). Additionally or alternatively, an encoding parameter could be determined for a sequence of data arrays (e.g. for every pair of data arrays in the encoding sequence, or for every three data arrays in the encoding sequence, etc.).

Thus, in an embodiment, the encoding parameter value to use is selected and then used for a sequence of one or more (adjacent) data arrays in the stream of data arrays being encoded. The number of data arrays in this sequence may be only a single data array, or there may be plural data arrays.

It would also be possible to select and change the encoding parameter value that is being used more frequently than between, e.g. successive, data arrays in the stream of data arrays being encoded, such as, and in an embodiment, during the encoding of a single data array. In this case therefore, a new encoding parameter value selection process may be, and is in an embodiment, performed during the encoding of a data array, for example, and in an embodiment, after a (and each) particular, in an embodiment selected, in an embodiment predefined, portion (fraction) of the data array has been encoded. For example, a first value of the encoding parameter to be used for encoding a data array could be selected in the manner of the technology described herein at the start of encoding the data array, and then a new value of the encoding parameter to be used selected after a particular fraction (e.g. half) of the data array has been encoded, and so on (i.e. this could be repeated after each particular, in an embodiment selected, portion (fraction) of the data array has been encoded).

For example, in the case of encoding (e.g. video encoding) schemes that allow the changing of encoding parameters, such as the quantization parameter, for respective blocks (e.g. 8×8 or 16×16 blocks) within a data array (e.g. frame) being encoded, then the encoding parameter value could, if desired, be selected and set for every block (or for groups of plural blocks, etc.).

This would then allow, for example, finer-grained control of the bit rate of the output bitstream.

In these arrangements, the encoding parameter value selection process could also use an estimated number of output bits for the part of the data array being encoded that has already been subject to some of the encoding process, if desired.

The encoding parameter whose value is selected based on the estimated/actual number(s) of bits used in the output bitstream to encode a previous array or arrays of data elements and the target output bit rate can be any suitable and desired encoding parameter that can (and in an embodiment does) affect (have some control over) the number of bits that will be included in the output bitstream when encoding the array of data elements being encoded.

In an embodiment, the encoding parameter is a parameter that can (and does) affect the amount of intermediate data that is generated and/or that is to be encoded for a data array.

In an embodiment, the encoding parameter is a "quality affecting" parameter, i.e. a parameter that affects the quality of the data array as it will be reproduced when decoding the encoded data array. Quality-affecting parameters will typically affect the number of bits that will be produced for an encoded data array (with higher quality encoding generally resulting in a higher number of bits in the output bitstream and vice-versa). Thus, in an embodiment, the encoding parameter whose value is selected comprises a parameter that is related to (that affects) the (output) encoding quality (the quality of the output encoded data array(s)).

Any suitable, e.g. quality related, parameter can be used for this purpose, and this may, e.g., depend upon the particular encoding scheme (e.g. standard) being used. In an embodiment, an encoding parameter that is (normally) used for rate control purposes in an or the encoding scheme, e.g. being used, is used. Thus, in an embodiment, the encoding parameter whose value is selected comprises a quantization parameter for the encoding process (e.g., and in an embodiment, that sets or affects the level and/or amount of quantization that is used for and/or applied to frequency domain coefficients representing difference values (residuals) between blocks of the data array being encoded and their corresponding reference blocks).

Other arrangements would, of course, be possible.

It would also be possible to select and set more than one value for an encoding parameter, and to select and set the values of or for more than one encoding parameter based on the estimated/actual number(s) of bits used in the output bitstream to encode the previous array(s) of data elements and a target output bit rate, if desired (although in an embodiment, only a single parameter is adjusted).

The value of the encoding parameter(s) can be set based on the estimated/actual number(s) of bits used in the output bitstream to encode the previous array(s) of data elements and a target output bit rate in any suitable and desired manner.

For example, there may be a particular, in an embodiment predefined, function that relates the value of the encoding parameter to a corresponding predicted output number of bits, which is then used to select the value of the encoding parameter accordingly. This function may be more or less sophisticated, as desired.

Such a function could be fixed (i.e. use the same relationship between the parameter value and the number of output bits in use), or it could be configured to be adaptable in use, for example with the encoding process (the encoder) performing some kind of analysis or tracking of the relationship between the value of the encoding parameter in question and the number of bits in the output bitstream as it encodes data arrays of the stream of data arrays, and adapting the function relating the value of the encoding parameter to the number of output bits on the basis of that tracking.

While it would be possible to estimate the number of bits in the output bitstream used to encode a previous data array based on an amount of intermediate data generated for that previous data array alone (and in one embodiment, that is what is done), in an embodiment, the accuracy of the estimates of the number of output bits based on the amounts of intermediate data determined for previously encoded data arrays is tracked, in an embodiment by comparing those estimates to the actual number of output bits that were generated when encoding the previously encoded data arrays, and that accuracy measure is then used to modify the estimated number of output bits determined based on an amount of intermediate data generated for a data array, to provide a modified output bit estimate for the data array, which modified output bit estimate is then used when selecting the value of the encoding parameter to use when encoding the current data array.

The Applicants have found that this can (potentially significantly) improve the bit count estimation process. For example, the Applicants have found that estimating the number of output bits based on the amount of intermediate data only may result in errors of the order of 10-20%, but modifying those estimates using a scaling factor based on an analysis of actual number of output bits to the estimated number of output bits for previously encoded data arrays can reduce the error in the estimates based on an amount of intermediate data generated for a data array to a few percent only.

Furthermore, modifying the estimate based on the amount of intermediate data generated for an array of data elements in this manner can also reduce or eliminate systemic errors such as any tendency for an estimate for a given input stream of data arrays to be consistently too large or too small, and also can reduce or eliminate any sensitivity to the input content that an estimate based on the amount of intermediate data generated for the data array alone may have.

The accuracy of the estimation process can be tracked and determined in any suitable and desired manner. In an embodiment, the estimated number of output bits for a given previously encoded data array is compared to the actual number of output bits that were generated for that previously encoded data array.

In an embodiment, the ratio of the actual number of output bits to the estimated number of output bits is determined, and used as an error factor (a scaling factor) to be applied to the estimate of the number of output bits based on an amount of intermediate data generated for a data array.

Other, e.g., more numerically complex functions, such as non-linear functions, could be used instead of a simple scaling factor, if desired. This may allow a more accurate modification of the estimated number of output bits to be achieved, but, e.g., at the expense of more numerical complexity during the estimation process. However, the Applicants have found that in general determining a scaling factor based on the ratio of the actual number of output bits to the estimated number of output bits for a previously encoded data array or data arrays can provide a sufficiently accurate output bit estimation process for a previous array of data elements, and without introducing a significant processing burden, that, may, e.g., be less suitable for real-time use.

Thus, in an embodiment, the actual number of output bits generated for previously encoded data arrays in the stream of data arrays being encoded is monitored and compared to corresponding estimates of the number of output bits based on an amount of intermediate data that were determined for those previously encoded data arrays, and the estimates of the number of output bits that will be generated for previous data arrays based on an amount of intermediate data are then modified in accordance with this tracking. In an embodiment, the tracking is used to determine a scaling factor that can be applied to an output bit estimate that is based on an amount of intermediate data generated for a data array, so as to (try to) compensate for any errors in that output bit estimation process.

It would be possible in this regard for the modification of the number of output bits estimated based on an amount of intermediate data generated for a data array to be modified based on an assessment of the accuracy of the estimate for one (a single) previously encoded data array only. However, in an embodiment, the modification process is based on an analysis of (e.g. an average over) a plurality of previously encoded data arrays, such as, and in an embodiment, a moving average based on a latest set of a particular, in an embodiment selected, in an embodiment predetermined, number of previously encoded data arrays, such as being based on a moving average taken over a few, e.g. the latest, two to four, previously encoded data arrays (e.g., and in an embodiment, for which the encoding process has been completed, such that the actual number of output bits generated for those data arrays by the encoding process will be and is known).

The Applicants have found in this regard that there may be a lag in the encoding of the data arrays that correlates to the number of encoding processors (e.g. processing cores) encoding the stream of data arrays in parallel, e.g. that corresponds to the number of processors plus two. Thus, the analysis of the accuracy of the estimation process may be appropriately based on, and determined from, for example, two to ten, or four to ten data arrays back (earlier) in the encoding order.

Such a measure, e.g. (moving) average, of the estimation process accuracy (e.g. scaling factor) can be determined in any suitable and desired manner. For example, a total number of estimated output bits and a total number of actual output bits for the set of data arrays over which the measure (e.g. average) is being determined could be determined and used to provide a measure (e.g. a scaling factor) of the accuracy of the estimation process.

In an embodiment, a measure of the accuracy of the estimation process is determined for each (finished) encoded data array individually (and in turn, as the data arrays are encoded), with the accuracy measure (e.g. scaling factor) determined for the latest fully encoded data array then being combined, e.g., and in an embodiment averaged, with the accuracy measures (e.g. scaling factors) determined for one or more earlier data arrays (e.g. the previous three or four or five (e.g. fully) encoded data arrays).

In these arrangements, a simple average could be used, but in the embodiment, a weighted average is used (so as to place greater emphasis on the most recent accuracy measure (e.g. scaling factor), for example). In an embodiment the average processing in effect applies a low pass filter to the individual data array accuracy measures (e.g. scaling factors) when and as they are combined.

Thus, in an embodiment, the method of the technology described herein comprises (and the rate control processing circuitry is configured to) estimating a number of bits used in the output bitstream based on an amount of intermediate data for a previous array of data elements by:

estimating a number of bits in the output bitstream that will be used to encode the previous array of data elements based on an amount of intermediate data generated for that previous array of data elements by the encoding process; and then modifying the estimate of the number of bits in the output bitstream that will be used to encode the previous array of data elements that was determined based on an amount of intermediate data generated for that previous array of data elements by the encoding process using an estimation modification factor that is based on a comparison of an actual number of bits used in the output bitstream to encode another array of data elements in the stream of arrays of data elements to an estimated number of output bits in the output bitstream to be used to encode that another array of data elements that was determined for that another array of data elements based on an amount of intermediate data generated for that another array of data elements.

Correspondingly, in an embodiment, the method of the technology described herein comprises (and the rate control processing circuitry is configured to):

determining the actual number of bits used in the output bitstream to encode a previous array of data elements in the stream of arrays of data elements;

comparing that determined actual number of output bits to an estimated number of output bits in the output bitstream to be used to encode that previous array of data elements that was determined for that previous array of data elements based on an amount of intermediate data generated for that previous array of data elements;

determining a bit count estimation modification factor (in an embodiment in the form of a scaling factor) based on the comparison;

modifying the estimate of the number of bits in the output bitstream that will be used to encode a previous array of data elements that was determined based on an amount of intermediate data generated for that previous array of data elements by the encoding process using the bit count estimation modification factor; and then, selecting the value of the encoding parameter to use when encoding the array of data elements currently to be encoded based on the modified estimated number of bits used in the output bitstream to encode the previous array of data elements and a target output bit rate for encoding the stream of arrays of data elements.

As discussed above, in an embodiment, this is done for and using a plurality of previously encoded arrays of data elements, with the estimate of the number of bits in the output bitstream that will be used to encode a previous array of data elements based on an amount of intermediate data generated for that previous array of data elements then being modified based on (using) an estimation modification factor that is based on the plural previously encoded arrays of data elements.

Other arrangements would, of course, be possible.

In an embodiment, any estimation modification factor (e.g. the amount of modification to be applied to an estimate of the number of bits in the output bitstream based on an amount of intermediate data generated for a data array) is set so as to not modify the estimated number of bits when a stream of data arrays is first being encoded, until such time as one (or more) of the data arrays in the stream has been fully encoded such that an actual output number of bits for an encoded data array is known, at which point the modification factor is in an embodiment then determined and begun to be adapted based on the fully encoded data arrays being produced.

Thus, in an embodiment, where the modification factor is a scaling factor, that scaling factor is in an embodiment initially set to a value of 1, but then changed as data arrays are fully encoded and so a measure of the accuracy of the output bit count estimation process can be determined.

In the case where a number of bits in the output bitstream that will be used to encode a previous data array based on an amount of intermediate data generated for that previous data array is being determined for more than one previous data array in the stream of data arrays (as discussed above), then the estimated number of output bits is in an embodiment modified using, and based on, the determined and tracked accuracy of the estimation process, for each of the previous data arrays for which a number of output bits is being estimated. In an embodiment each output bit estimate is modified using the same modification conditions (e.g. scaling factor) (e.g. such that each estimated output number of bits will use the latest value of the scaling factor, for example), but it would also be possible where a modified output bit estimate has already been determined for a previous data array (e.g. based on a previous value of the scaling factor) to re-use that modified estimate for that previous data array if desired.

Other arrangements would, of course, be possible.

While it would be possible to only estimate an amount of bits in the output bitstream that would be used to encode a previous data array to then be used when selecting a value of an encoding parameter to use when encoding the data array that is currently being encoded for a previous data array or data arrays for which all of the intermediate data (a complete set of intermediate data) has been generated (and in one embodiment, that is what is done), in an embodiment, an estimate of the number of bits in the output bitstream that will be used to encode the previous data array is determined for a (and/or for plural) previous data array for which only some but not all of the intermediate data has been generated (at the time that the output bit estimate is required for use when selecting a value of an encoding parameter to use when encoding the array of data elements that is currently being encoded).

The Applicants have recognised in this regard that using output bit estimates for data arrays for which only some but not all of the intermediate data has been generated may allow bit estimates for more recent previous frames in the stream of data arrays being encoded to be used than if the process only used those previous data arrays in the stream of data arrays being encoded for which all of the intermediate data had already been generated (for which the generation of the intermediate data has been completed). This may then facilitate, for example, allowing the rate control operation to adapt more quickly to any dynamic changes (e.g. in content) in the sequence of data arrays that are being encoded.

In this case, it will be necessary to derive an output bit count estimate when only some but not all of the intermediate data for the previous data array has been generated. This can be done in any suitable and desired manner.

In an embodiment, where only some but not all of the intermediate data for a previous data array for which an output bit estimate is to be determined has been generated, then the amount of intermediate data that has been generated for the data array in question is used to provide an estimated amount of intermediate data for the whole of the data array, e.g., and in an embodiment, by scaling up the amount of intermediate data that has been generated to provide an estimate of the amount of intermediate data for the data array as a whole, e.g., and in an embodiment, based on the portion (fraction) of the data array for which the existing intermediate data has been generated. Thus, for example, if intermediate data has been generated for half of the data array, then that amount of intermediate data may be doubled to provide an estimate for the amount of intermediate data for the whole data array.

The so-estimated amount of intermediate data for the whole data array can then be, and is then in an embodiment, used to provide an estimate of the number of bits used in the output bitstream to encode the data array (e.g., and in an embodiment, in the manner discussed above).

In this case therefore, the amount of intermediate data generated so far for the data array will be used to estimate the total amount of intermediate data that will generated for the data array, with that estimated total amount of intermediate data then being used to estimate the output bit count for the data array.

The Applicants have recognised in this regard that while this arrangement may in general provide a suitable estimate of the total amount of intermediate data that will be generated for a data array, it may be less accurate in situations where, for example, the complexity of the content of the data array varies (is distributed unevenly) across the data array. In this case, simply scaling the amount of intermediate data for a first part of the data array may not be such a suitable estimate for the amount of intermediate data for the overall data array. This could be the case, for example, for images where the top half is a clear sky while the bottom half contains lots of detail.

In an embodiment therefore, it is also or instead (and in an embodiment also) possible to estimate the number of output bits that will be generated for a data array for which only some but not all of the intermediate data has been generated (at the time the output bit estimate for that data array is required) based on an amount of intermediate data that has been generated for another (a different) previous data array (e.g. and in an embodiment, the closest preceding data array in the encoding order for which a full (a complete) amount of intermediate data has been generated).

In this case, the amount of intermediate data for the data array for which the output bit estimate is required is in an embodiment compared to the amount of intermediate data generated for the corresponding part of the previous data array for which a complete set of intermediate data has been generated, and the result of that comparison then used, together with the estimate of the number of bits used in the output bitstream for the previous data array for which a complete set of intermediate data has been generated, to provide an estimate of the number of bits in the output bitstream that will be used for the data array for which only part of the intermediate data has been generated.

This is in an embodiment done by using the ratio of the amount of intermediate data that has been generated for the part of the data array for which only part of the intermediate data has been generated to the amount of intermediate data that was generated for the corresponding part of the previous data array for which all of the intermediate data has been generated, and then using that ratio as a scaling factor to scale the estimated number of bits used in the output bitstream to encode the previous data array for which a complete set of intermediate data has been generated, to thereby provide an estimate for the number of bits that will be used in the output bitstream to encode the data array for which only part of the intermediate data has been generated.

Again, a more sophisticated estimation process (rather than simply using a scaling factor), could be used if desired.

This arrangement may provide an estimate that is less susceptible to variations of content complexity within a given data array, although it may on the other hand be less accurate where there are significant differences between the content complexity of the two different data arrays that are being considered, for example. In particular, the Applicants have recognised that while using information from another, different data array may generally be satisfactory, if the partial amounts of intermediate data for the two data arrays being considered are too different, then that estimation process can become inaccurate.

In view of this, in an embodiment, the technology described herein is able to use, and uses, both of the above estimation methods, and is operable to select between the two estimation methods, e.g., and in an embodiment, depending upon whether a given condition or criteria is met.

In an embodiment, the output number of bits for a data array for which only part of the intermediate data has been generated is estimated using an estimate based on information from another previous data array (i.e. the second process discussed above), unless the differences between the amount of intermediate data generated for the part of the current data array being considered and for the (corresponding part of the) previous data array for which all of the intermediate data has been generated is sufficiently large, in which case the number of output bits is then estimated instead using the first method described above, i.e. by scaling the amount of intermediate data generated for the part of the data array that has been completed to provide an estimate of the intermediate data for that data array as a whole.

The "threshold" amount of difference used to trigger the alternative estimation process can be selected as desired, and may be any suitable and desired "difference" measure. In an embodiment, it is based on the ratio (scaling factor) that is determined between the amount of intermediate data for the data array for which not all the intermediate data has been generated and the amount of intermediate data generated for the corresponding part of the another data array for which all the intermediate data has been generated, with in an embodiment the alternative estimation process (the first process discussed above) being selected when that ratio is greater than a particular, in an embodiment selected, in an embodiment predetermined threshold amount. A suitable threshold amount for this would be, for example, if the ratio is greater than or greater than or equal to 4.

Thus, in an embodiment, the method of the technology described herein comprises (and the rate control circuitry is correspondingly configured to (includes processing circuitry configured to) estimate the number of bits used in the output bitstream to encode a previous data array for which intermediate data has been generated for only a part of that data array, by:

determining the amount of intermediate data generated for a corresponding part of another data array for which intermediate data for all of that another data array has been generated;
and
when a difference between the amount of intermediate data generated for the part of the previous data array, and the amount of intermediate data generated for a corresponding part of the another data array for which all of the intermediate data has been generated, is less than a threshold difference:
  estimating the number of bits to be used in the output bitstream to encode the previous data array for which intermediate data has been generated for only a part of that data array based on the amount of intermediate data generated for the part of the previous data array for which intermediate data has been generated for only a part of that data array, and the amount of intermediate data generated for the corresponding part of the another data array and an estimate of the number of bits used in the output bitstream to encode the another data array for which all of the intermediate data has been generated;
and
when a difference between the amount of intermediate data generated for the part of the previous data array, and the amount of intermediate data generated for the corresponding part of the another data array for which all of the intermediate data has been generated, is not less than the threshold difference:
  estimating a total amount of intermediate data that will be generated for the previous data array for which intermediate data has been generated for only a part of that data array based on the amount of intermediate data generated for the part of that previous data array for which intermediate data has been generated (and without using any measure of the amount of intermediate data generated for the another data array);
and
using the estimated total amount of intermediate data that will be generated for the previous data array for which intermediate data has been generated for only a part of that data array to estimate the number of bits used in the output bitstream to encode that previous data array for which intermediate data has been generated for only a part of that data array.

Other arrangements would, of course, be possible.

It would be possible to treat (consider) all of the intermediate data generated for an array of data elements collectively, i.e. as a "single" amount of intermediate data from which the number of bits in the output bitstream that will be used to encode the previous data array is then estimated.

However, as discussed above, it can be the case that the intermediate data that is generated for a data array by an encoding process contains different types of intermediate data such as, for example, motion vectors and differences (residual) data. Moreover, it may be the case that these different types of intermediate data are treated differently in the output encoded bitstream. For example, in video encoding, motion vector data may be included as block header data in the output bitstream, whereas the difference (residual) data may be, in effect, included as "payload" data in the output bitstream.

The Applicants have further recognised that the different types of intermediate data may also have different effects on the overall number of output bits, depending upon, for example, the target output bit rate that is desired. For example, when encoding video data, for high target output bit rates, the bitstream may be dominated by residual data, but for very low bits rates, the largest part of the output bitstream may consist of the motion vector (header) data.

The Applicants have recognised therefore that it may be advantageous, at least in some circumstances, to treat different types of intermediate data (if present) separately (and differently) in the estimation process.

Thus, in an embodiment, respective, separate, amounts of intermediate data that have been generated by the encoding process are determined for each of plural different types of intermediate data, and then those separate, respective intermediate data type amounts are used when estimating the number of output bits that will be used to encode the data array in question. For example, the different intermediate data type amounts could be used as respective, separate input parameters in a function that then determines an overall amount of output bits that will be included in the output bitstream for encoding the data array. Alternatively, a separate output bit amount could be determined for each intermediate data type that is being considered separately, and then the separate intermediate data type output bit amounts combined (e.g. summed) to provide an overall estimate of the number of output bits that will be used to encode the data array.

This would then allow different types of intermediate data to be treated differently during the output bit count estimation process, and may therefore, for example, further enhance the accuracy of the estimation process, e.g. for and over a larger variety of bit rates.

It would also correspondingly be possible to use different bit count estimation modification factors (e.g. scaling factors) for the different types of intermediate data that are being considered separately, if desired. This may again further enhance the accuracy of the output bit rate estimation process.

In an embodiment, particularly where the encoding process is a video encoding process, two different types of intermediate data are considered separately in one or more of the manners discussed above, namely intermediate data that will be provided as header data in the output bitstream (e.g. and in an embodiment comprising motion vector data), and intermediate data that will comprise payload data in the output bitstream, such as, and in an embodiment, differences (residual) data (such as quantized frequency domain coefficients).

Other arrangements would, of course, be possible.

Although the technology described herein has primarily been described above with reference to the processing of a given data array, as will be appreciated, the process of the technology described herein is in an embodiment performed for plural data arrays of a stream of data arrays being encoded, and in an embodiment for each data array in the stream of data arrays being encoded, as appropriate.

Once encoded, the encoded data array(s) may be used in any desired and suitable way. For example, the encoded data array(s) may be output, e.g. stored in memory and/or streamed to another device. Thus, the data processing apparatus may comprise output circuitry (e.g. write out circuitry) configured to output (e.g. write out) the encoded data array(s), e.g. to memory or to another device.

The (output) encoded data array(s) may correspondingly later be retrieved and/or received, e.g. for decoding. Thus, the data processing apparatus may comprise input circuitry (e.g. read in circuitry) configured to input (e.g. read in) encoded data array(s), e.g. from memory, and decoding processing circuitry configured to perform a decoding process that decodes an encoded data array. The decoding process can take any desired and suitable form, for example that corresponds to the encoding process that was used when encoding the data array(s).

A decoded data array may be used in any desired and suitable way. For example, the decoded data array(s) may be output (e.g. by an output (e.g. display) processor), e.g. for display.

The processes described herein may be performed by any desired and suitable apparatus. For example, the processes described herein may be performed by a video processor (codec). The data processing apparatus described herein may therefore comprise or may be a video processor. Thus, the processing circuitry described herein in any embodiment may form part of a video processor. The data processing apparatus may comprise, or may be, or may form part of, a system on chip (SoC).

It is believed that the technology described herein is particularly useful for encoding systems which use plural encoders (encoding cores) such that, for example, plural data arrays may be encoded in parallel by the plural encoders, and/or different parts of a given data array may be encoded in parallel by the different encoders. Thus, in an embodiment, the apparatus of the technology described herein includes plural encoders (sets of encoding circuitry) which are, in an embodiment, collectively controlled in the manner of the technology described herein to achieve a desired output bit rate for a stream of data arrays that is being encoded.

The technology described herein can be used for all forms of data arrays that a data processing apparatus may provide and/or use, such as images or frames for display. Thus, as indicated above, the arrays of data elements may comprise image data and/or may correspond to images or frames of image data.

The technology described herein can correspondingly be used with and for any suitable and desired encoding (e.g. video encoding) scheme and standard. In an embodiment, it is used with and for the HEVC encoding standard.

In an embodiment, the various functions of the technology described herein are carried out on a single data (e.g. image) processing platform that provides and/or uses the arrays of data elements.

As will be appreciated by those skilled in the art, the data processing apparatus of the technology described herein may be part of an overall data processing system that includes, for example, a host (e.g. central) processor. The host processor may, for example, execute applications that require data processing by the data processing apparatus. The host processor may send appropriate commands and data to the data processing apparatus to control it to perform the data processing operations and to generate and/or use an output required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The memory may be any desired and suitable memory of or for the data processing apparatus. The memory may be external to the data processing apparatus, e.g. video processor and/or system on chip (SoC). The memory may be, for example, main system memory.

The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

As discussed above, embodiments of the technology described herein relate to encoding arrays of data elements. Various embodiments of the technology described herein will now be described in the context of the encoding frames of image data for display. However, the concepts described herein can equally be applied to contexts in which arrays of other types of data are to be encoded.

Figure 2:
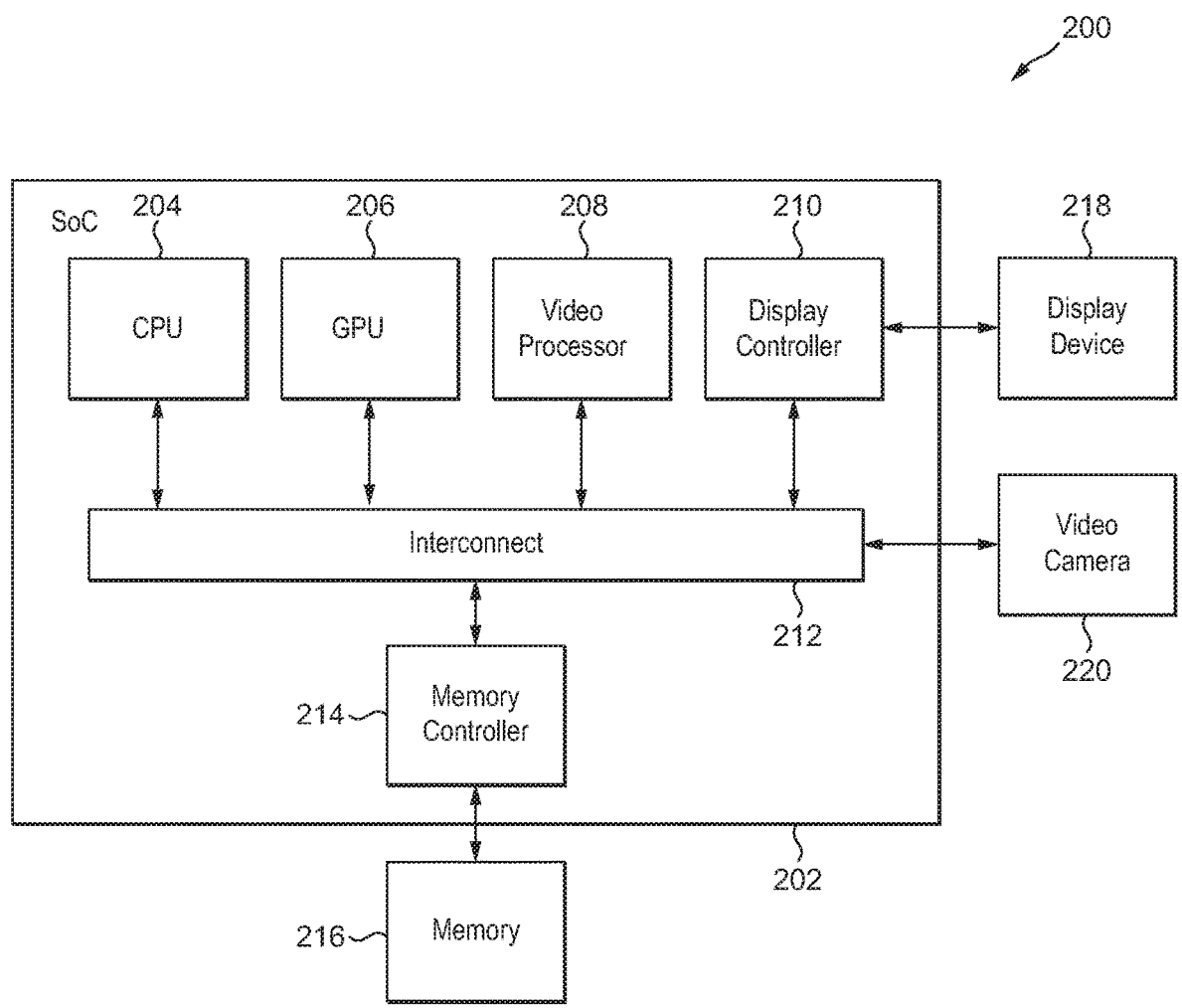
FIG. 2 shows schematically a data processing system according to embodiments of the technology described herein.

FIG. 2 shows schematically an embodiment of a data processing system 200 that can provide and use data arrays, such as frames for display, that have been encoded in the manner of the present embodiments.

In this embodiment, the system 200 comprises a data processing apparatus in the form of a system on chip (SoC) 202. The system 200 also comprises off-chip (main) memory 216, a display device 218 and a video camera 220.

The SoC 202 comprises a central processing unit (CPU) 204, a graphics processing unit (GPU) 206, a video processor 208, a display controller 210, an interconnect 212 and a memory controller 214.

As is shown in FIG. 2, the CPU 204, GPU 206, video processor 208, and display controller 210 communicate with each other via the interconnect 212 and with the memory 216 via the interconnect 212 and memory controller 214. The display controller 210 also communicates with the display device 218. The video camera 220 also communicates with the SoC 202 via the interconnect 212.

In the following embodiments, the video processor 208 reads in image data from memory 216, encodes the image data, and then outputs that encoded image data, e.g. for storage in memory 216 or for streaming to another device. The encoded image data can later be retrieved and decoded, e.g. by the video processor 208, or received and decoded by another device. The decoded image data can then be output, e.g. by the display controller 210 to the display device 218 or by another device, for display.

Figure 3:
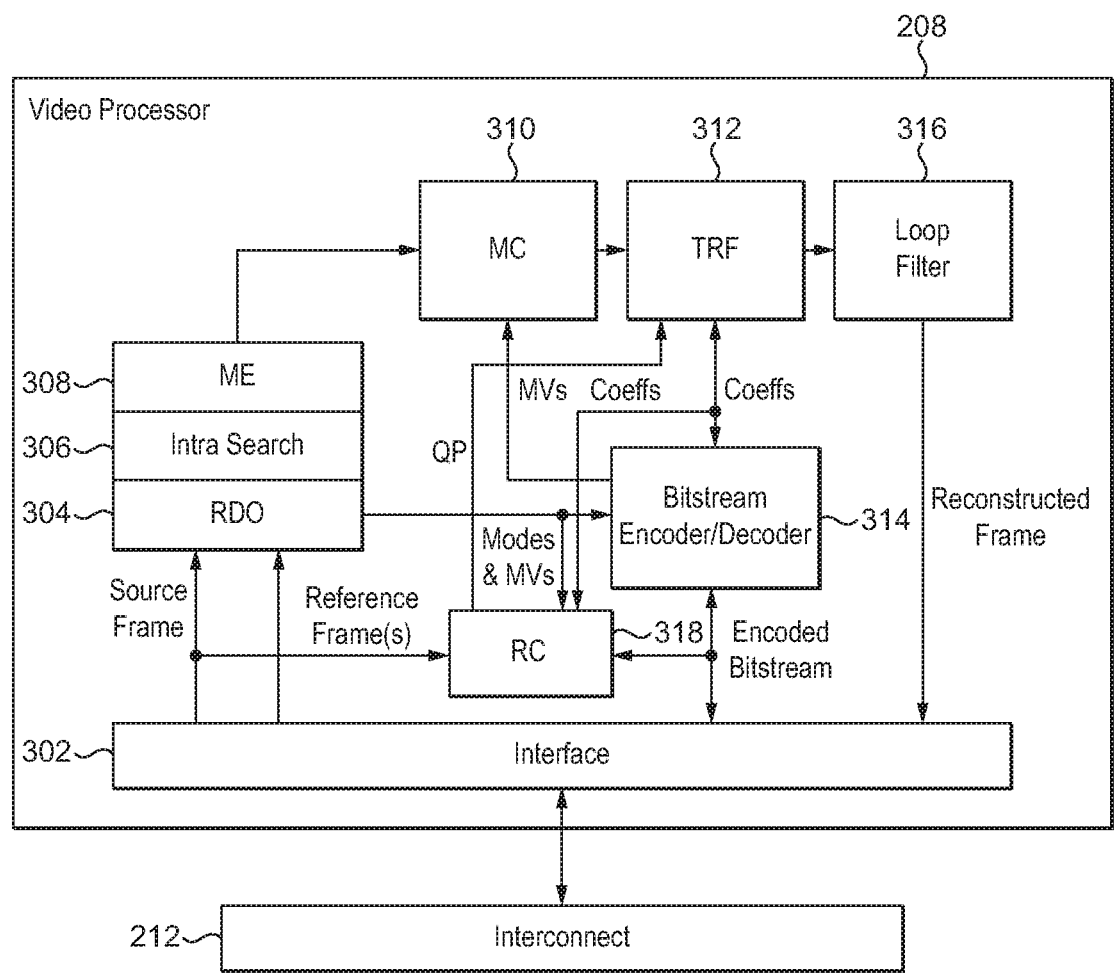
FIG. 3 shows schematically a video processor according to embodiments of the technology described herein.

FIG. 3 shows further details of a video processor 208 that can be used to encode a stream of arrays of data elements, such as frames for display, in the manner of the present embodiments.

In this embodiment, the video processor 208 comprises an interface 302 that can provide, via the interconnect 212, a current "source" frame to be encoded. In a similar manner, the interface 302 can provide, via the interconnect 212, one or more previous and/or subsequent "reference" frames that may be used when encoding the source frame.

In this embodiment, the source frame is divided into plural source blocks to be encoded on a block by block basis. Each source block is initially 16×16 data elements (pixels) in size. Each source block can, however, be further divided into two 16×8 or 8×16 source blocks or four 8×8 source blocks, if that would provide for less costly encoding. Each of these smaller source blocks can also be further divided into two 8×4 or 4×8 source blocks or four 4×4 source blocks, if that would provide for less costly encoding. Other source block sizes could of course be used as desired.

In this embodiment, a source block can be encoded using another block within the source frame itself, i.e. using "intra" mode encoding. The video processor 208 accordingly comprises inter search circuitry 306 that, for a given source block in the source frame, searches within the source frame itself for one or more suitable candidate reference blocks to consider using when encoding that source block. The one or more candidate reference blocks may be selected using any suitable metric that indicates the similarity or difference between the source block and the potential reference block in question, such as a sum of absolute differences (SAD) value.

In this embodiment, the one or more reference frames are also divided into plural blocks (which may correspond in size to the source block) that may be used when encoding the source frame, i.e. using "inter" mode encoding. The video processor 208 accordingly comprises ME (motion estimation) circuitry 308 that, for a given source block in the source frame, searches within the one or more reference frames for one or more suitable candidate reference blocks to consider using when encoding that source block. A candidate reference block can be derived by using a motion vector (MV) that describes how a particular block of a particular frame is mapped (e.g. by translation, rotation and/or scaling) to that candidate reference block. Again, the one or more candidate reference blocks may be selected using any suitable metric that indicates the similarity or difference between the source block and the potential reference block in question, such as a sum of absolute differences (SAD) value.

The video processor 208 also includes RDO (Rate Distortion Optimisation) circuitry 304 that performs an RDO process in respect of each source block using the candidate reference blocks for that source block. In this embodiment, the output of the RDO circuitry 304 comprises a selected set of encoding options for a particular source block (e.g. having a particular size in terms of data elements of the frame). In this embodiment, the selected set of encoding options further comprises a particular way to derive a reference block for that particular source block (e.g. the encoding mode to be used, such as intra, inter, unidirectional, bidirectional, merge, etc., mode, and/or the motion vector to be used).

The video processor 208 also includes motion compensation (MC) circuitry 310 that is operable to apply a motion vector generated by the ME circuitry 308 to a selected reference frame to derive a selected reference block, and transform (TRF) circuitry 312 that can also derive a selected reference block for a source frame, and that is also operable to determine difference values (residuals) and to transform the difference values (residuals) to generate a set of frequency domain coefficients and to then quantize those frequency domain coefficients.

The loop filter 316 of the video processor 208 is operable to smooth or "de-block" regions of a reconstructed source frame.

The bitstream encoder/decoder 314 of the video processor 208 is operable to perform an (entropy) encoding operation to encode quantized frequency domain coefficients and modes and motion vector information to provide an encoded bitstream representing an encoded data array, and, correspondingly, to perform an (entropy) decoding process on an encoded bitstream to provide appropriate quantized frequency domain coefficients and motion vectors to allow an encoded data array to be reconstructed.

Finally, as shown in FIG. 3, the video processor 208 also includes rate control circuitry (rate controller, RC) 318 that is operable to control the encoding process so as to (try to) ensure that the output encoded bitstream when encoding a sequence of data arrays achieves a desired output bit rate. To do this, as shown in FIG. 3, the rate control circuitry (rate controller) 318 receives information relating to the source frames and the encoded bitstream output by the bitstream encoder 314, together with information relating to the intermediate data, such as the motion vectors and the quantized frequency domain coefficients that are being generated for the encoding process, and then sets the quantization operation of the transform (TRF) circuitry 312 appropriately, so as to achieve a desired output bit rate. This operation will be discussed in more detail below.

The rate control circuitry (rate controller) 318 may comprise, for example, fixed function circuitry for performing the rate control operation, or may comprise appropriately programmed programmable processing circuitry, such as an appropriately programmed microcontroller.

The overall encoding (and decoding) operation for a data array in the present embodiments will now be discussed in more detail with reference to FIG. 4.

Figure 4:
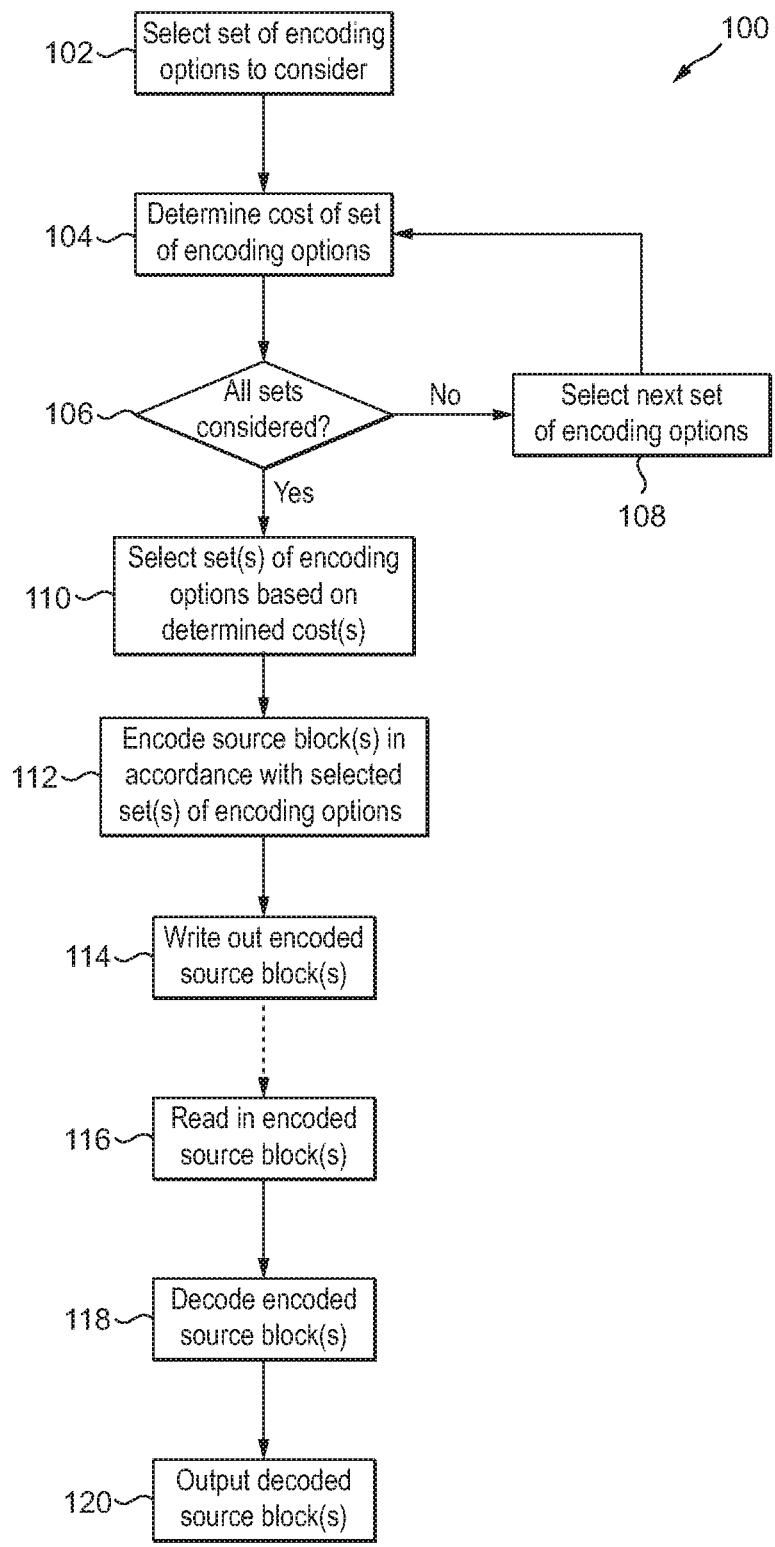
FIG. 4 shows a process of encoding and decoding a data array.

FIG. 4 illustrates the process 100 of selecting an encoding option to use for a source block of data elements of a data array, encoding the source block using the selected encoding option, and, subsequently, decoding the encoded block for use, performed by the video processor 208.

As shown in FIG. 4, for a given source, e.g. video, frame (data array) to be encoded, a set of encoding options to consider for a region of the source frame is selected (step 102). The set of encoding options may define, for example, the particular source block (e.g. having a particular size in terms of data elements of the frame) to use, and/or can include, for example, particular motion vectors and/or a particular encoding mode (intra, inter, forward, backward, uni-directional, bi-directional, merge, etc. mode) used to derive the reference block for that particular source block.

A cost value is then determined for that set of encoding options (step 104), using RDO circuitry 304. The cost value may consider, for example, an output bit count and a distortion value for the set of encoding options in question. This is repeated for each set of encoding options to be considered (steps 106 and 108).

Once all of the sets of encoding options have been considered then one or more of the sets of encoded options is selected as the encoding option to use for the source frame blocks (step 110) and each of the one or more source blocks for the region are then encoded in accordance with the selected set of encoding options for that source block (step 112).

The encoded source blocks may then, e.g., be written out to memory (step 114) and subsequently read and decoded for output (e.g. display) (steps 116, 118 and 120).

As will be appreciated, the above steps of FIG. 4 would be performed in respect of each region of the source frame and in respect of each frame of a stream of frames, so as to, for example, generate and store an encoded stream of frames.

Various alternative embodiments to the process of FIG. 4 are also contemplated.

For another example, instead of being written out to memory, the encoded stream of frames may be streamed to another device. That other device may then decode the encoded stream of frames and output the decoded stream of frames, e.g. for display.

A process of encoding a source block of a source frame using a selected set of encoding options (e.g. as per step 112 of FIG. 4) will now be described with reference to FIG. 3.

Firstly, a selected reference block that is to be used to encode a selected source block is provided. For example, where the source block is to be encoded in inter mode, MC (motion compensation) circuitry 310 applies a selected motion vector generated by the ME circuitry 308 to a selected reference frame to derive the selected reference block. Similarly, where the source block is to be encoded in intra mode, a selected reference block of the source frame is derived by TRF (transform) circuitry 312.

In either case, the TRF circuitry 312 then subtracts the data elements of the selected source block from the data elements of the selected reference block to generate a set of difference values. The TRF circuitry 312 then applies a full forward discrete cosine transformation process to the set of difference values to generate a set of frequency domain coefficients. The TRF circuitry 312 then applies a full quantisation process to the set of frequency domain coefficients to generate a set of quantised coefficients.

A bitstream encoder/decoder 314 then encodes the coefficients for the source block that are generated by the TRF circuitry 312, and the selected modes and/or motion vectors that were used in the encoding process. The encoding scheme can comprise any suitable entropy (variable length) coding scheme.

As part of this process, the rate control circuitry (rate controller) 318 receives, as discussed above, information relating to the source frames and the encoded bitstream output by the bitstream encoder 314, together with information relating to the intermediate data, such as the motion vectors and the quantized frequency domain coefficients that are being generated for the encoding process, and then sets the quantization operation of the TRF circuitry 312 appropriately, so as to (try to) achieve a desired output bit rate.

As will be appreciated, the above encoding process is repeated for each selected source block of the source frame using the selected sets of encoding options for the source frame.

The output of the bitstream encoder/decoder 314 is accordingly an encoded bitstream that comprises sets of encoded coefficients and the selected modes and/or motion vectors that were used in the encoding process.

The encoded bitstream can then be output, e.g. to memory 216 or streamed to another device, via the interface 302.

A process of decoding an encoded source block (e.g. as per step 118 of FIG. 4) will also now be described with reference to FIG. 3.

First, an encoded bitstream is provided, e.g. from memory 216 or from another device, via the interface 302.

The bitstream encoder/decoder 314 then decodes the encoded bitstream to generate a set of quantised coefficients for the source block to be reconstructed. The decoding scheme can comprises any suitable decoding scheme that corresponds to the entropy encoding scheme that was used to encode the bitstream.

The TRF circuitry 312 then applies a full dequantisation process to the set of quantised coefficients to generate a set of frequency domain coefficients for the source block to be reconstructed. The TRF circuitry 312 then applies a full inverse discrete cosine transformation process to the set of frequency domain coefficients to generate a set of difference values for the source block to be reconstructed.

A reference block that was used to encode the source block is also provided. For example, where the source block was encoded in inter mode, the relevant reference block is derived from a previously reconstructed reference frame. Similarly, where the source block was encoded in intra mode, the relevant reference block is derived from a previously reconstructed region of the source frame.

In either case, the TRF circuitry 312 then adds the set of difference values to the data elements of the reference block to generate the data elements of the reconstructed source block.

As will be appreciated, the above decoding process is then repeated for each source block of the source frame.

A loop filter 316 is then used to smooth or "de-block" the regions of the reconstructed source frame. The reconstructed source frame can then be output, e.g. for display, via the interface 302.

As discussed above, the technology described herein is particularly concerned with the process known as "rate control" when encoding a stream of data arrays, such as a stream of video frames (that will be performed, e.g., by the rate controller 318 shown in FIG. 3).

Figure 5:
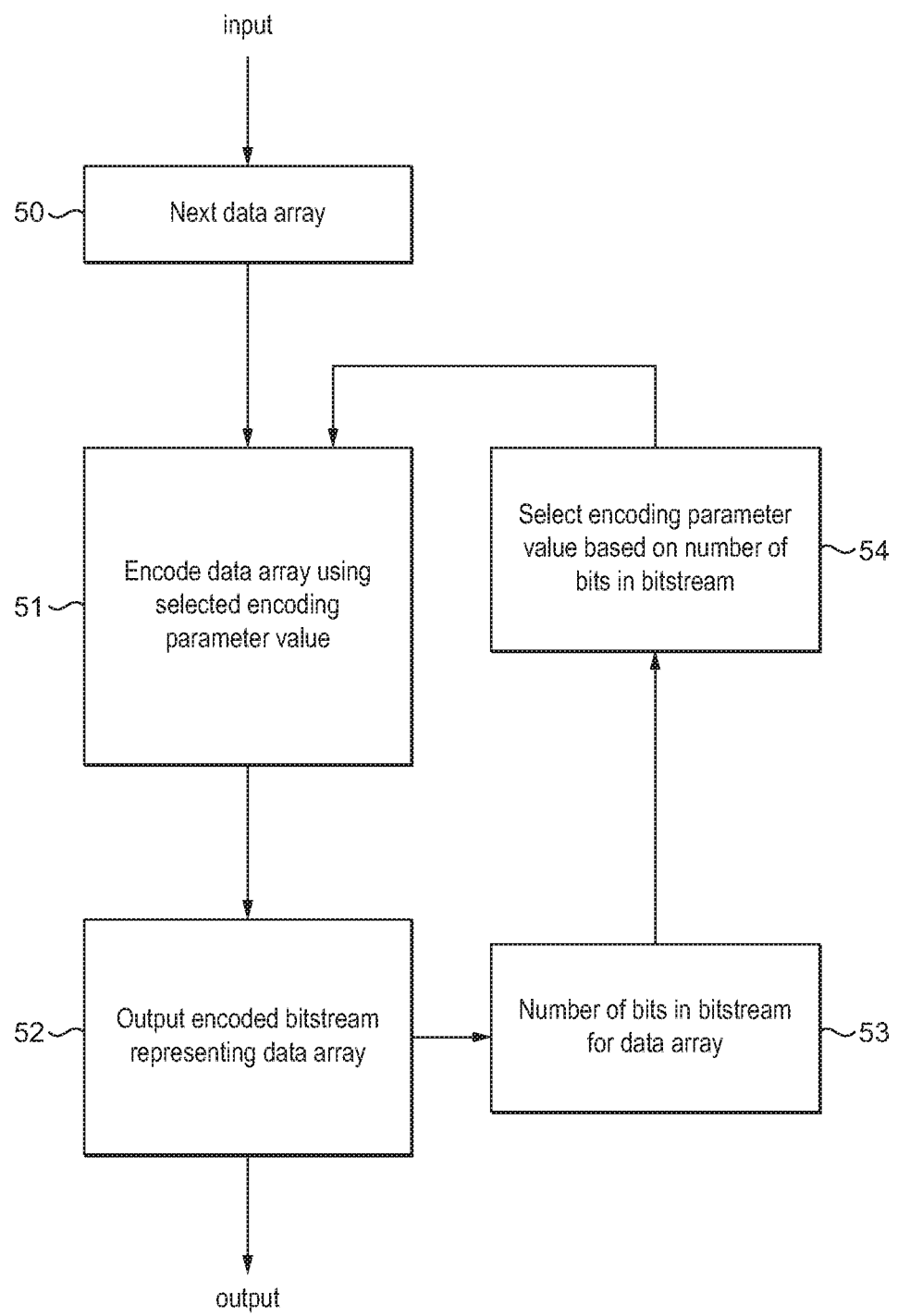
FIG. 5 shows an output bit rate control process when encoding a stream of data arrays.

FIG. 5 illustrates the rate control process and shows that for a stream of data arrays 50, such as input pictures (such as frames of video), which are each being encoded 51 using particular encoding parameters to provide an output bitstream 52 representing the input data arrays in an encoded form (and which, for example, will be saved in storage or transmitted over a network), information 53 relating to the number of bits that have been included in the output bitstream when encoding a data array is used to select 54 the value of an encoding parameter to be used for a later data array in the encoding order, so as to (try to) ensure that the output bitstream is produced at or close to a particular target output bit rate.

The technology described herein and the present embodiments relate in particular to such rate control in, e.g., video, encoding processes that generate sets of intermediate data representing arrays of data elements to be encoded, which intermediate data is then (e.g. entropy) encoded to provide an output bitstream representing the arrays of data elements in an encoded form (i.e. in encoding processes of the type illustrated in FIG. 1).

In the present embodiments, the set of intermediate data that is generated for a data array being encoded comprises motion vector information (that allows a reference block for a given block of data elements of the data array being encoded to be determined), and difference (residuals) data that allows a set of difference values representative of the differences between the block of data elements being encoded and the determined reference block to be determined. (Other arrangements would, of course, be possible.)

In the present embodiments, the "rate control" operation is performed by using both estimated and actual (where known) numbers of bits used in the output bitstream to encode previous arrays of data elements, together with a target output bit rate for the output bitstream produced when encoding the arrays of data elements, to select the value of an encoding parameter to use when encoding a (next) array of data elements in a stream of arrays of data elements being encoded.

In particular, the rate control process (the rate controller) determines the current average output bit rate for the immediately preceding sequence of, e.g., ten, data arrays based on estimated or actual numbers of bits used in the output bitstream for those data arrays, and compares that to the desired target output bit rate, and then selects the value of the encoding parameter to use for the current data array being encoded accordingly (e.g. to (try to) achieve a number of output bits for the data array currently being encoded that will converge the current output bit rate that the encoding process is achieving towards or keep it at the target output bit rate).

(As discussed above, the Applicants have recognised the actual number of output bits may not yet be known for more recent data arrays, and so in view of this, in the present embodiments, and in accordance with the technology described herein, the rate control process also determine estimates of the number of bits that will be included in the output bitstream for one or more previous data arrays in the stream of arrays being encoded, and then uses those estimates for those data arrays when determining the current average output bit rate for a preceding sequence of data arrays.)

In the present embodiments, the target output bit rate is defined as a bit rate per second and may, e.g., be fixed for the entire encoding process (e.g. for the stream of data arrays in question), or may be variable in use.

Other arrangements would, of course, be possible.

Figure 6:
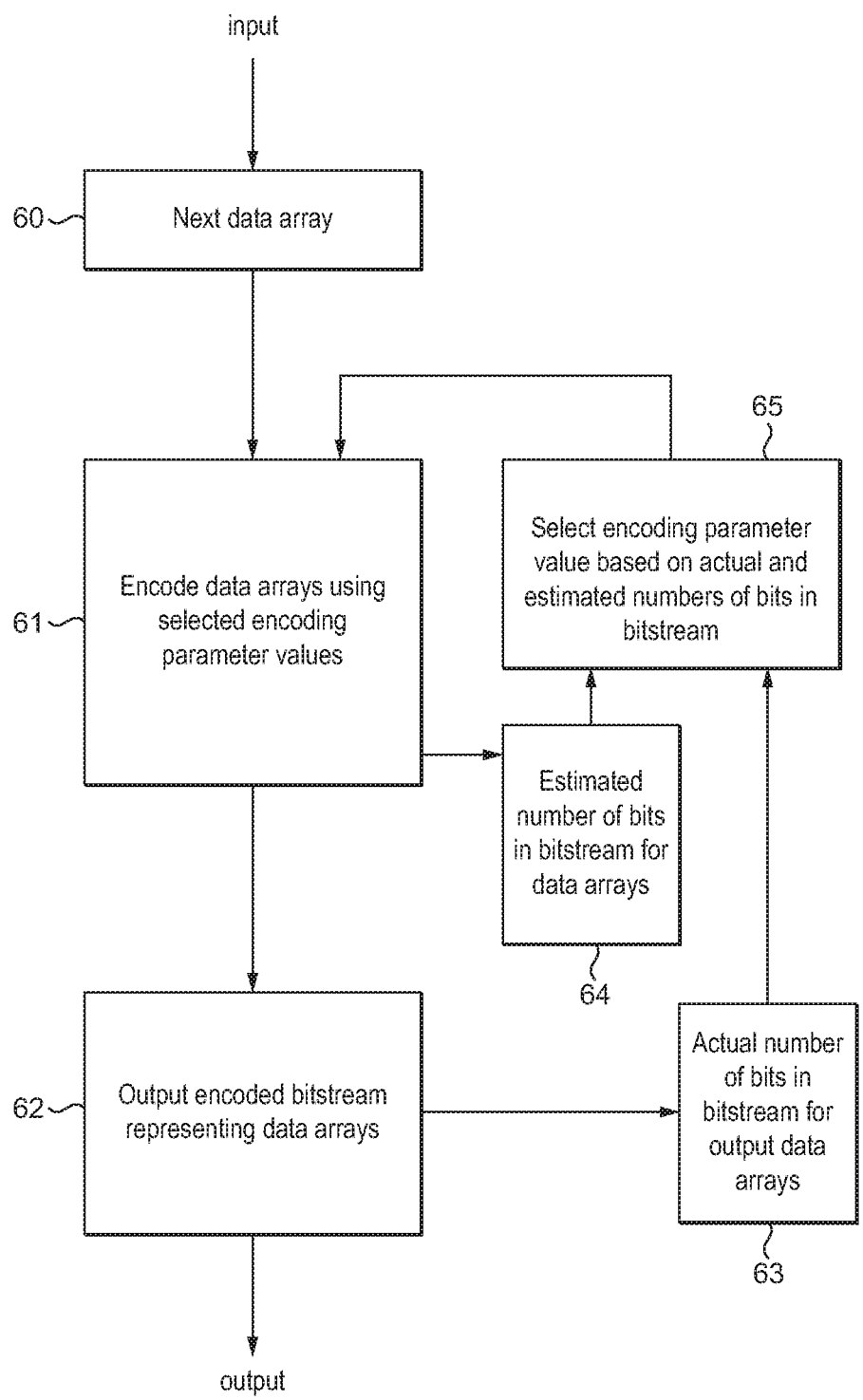
FIG. 6 shows an embodiment of an output bit rate control process when encoding a stream of data arrays that is in accordance with the technology described herein.

FIG. 6 illustrates this process in an embodiment of the technology described herein, and thus shows that for a stream of data arrays 60, which are each being encoded 61 using particular encoding parameters to provide an output bitstream 62 representing the input data arrays in an encoded form, information 63 relating to the actual number of bits that have been included in the output bitstream when encoding a data array or data arrays, and estimated 64 numbers of bits that will be included in the output bitstream for a data array or arrays that is being encoded (but for which the actual number of output bits is not yet known), is used to select 65 the value of an encoding parameter to be used for a later data array in the encoding order, so as to (try to) ensure that the output bitstream is produced at or close to a particular target output bit rate.

In this process, where the actual number of bits used in the output stream for a previous data array that is being considered for the rate control operation is known, then that actual number of bits 63 is used for that data array when determining the current average output bit rate for a preceding sequence of data arrays (that includes that data array).

On the other hand, where the actual number of bits used in the output stream for a previous data array that is being considered for the rate control operation is not yet known, then an estimated number of bits 64 is used for that data array when determining the current average output bit rate for a preceding sequence of data arrays (that includes that data array).

The present embodiments estimate the number of bits used in the output bitstream for a data array based on an amount of intermediate data generated for that data array. In particular, a fixed, non-linear function, f, that relates the amount of intermediate data to a number of bits that would be used in the output bitstream to encode that amount of intermediate data is used for this purpose.

Thus:

$$B_{x;estim}=f(M_x)$$

where $B_{x;estim}$ is the estimated number of output bits for data array (frame) x;

$M_x$ is the amount of intermediate data for the data array (frame) x; and f is the function that relates the amount of intermediate data to a number of bits that would be used in the output bitstream.

(The function, f, may be based, e.g., on an analysis of the encoding of multiple arrays of data elements so as to identify and determine an appropriate function relating the amount of intermediate data to the number of bits that will be in the output bitstream for encoding that amount of intermediate data. Such a relationship may be determined, for example, by offline bench-marking of arrays of data elements.)

In the present embodiments, the accuracy of the estimates of the number of output bits based on the amounts of intermediate data determined for previously encoded data arrays is tracked, and that accuracy measure is then used to modify the estimated number of output bits determined based on an amount of intermediate data generated for a data array.

In particular, the ratio of the actual number of output bits to the number of output bits estimated for a data array is determined, and used as an error factor (a scaling factor) to be applied to the estimate of the number of output bits based on an amount of intermediate data generated for a data array.

Thus:

$$A_x=B_{x;act}/f(M_x)$$

where:

$A_x$ is the "error" scaling factor;

$B_{x;act}$ is the actual number of output bits generated for a data array; and $f(M_x)$ is the estimated number of output bits for the data array (as discussed above).

The estimated number of output bits for a later data array y, will then be determined as:

$$B_{y;estim}=A_x \cdot f(M_y).$$

It would be possible in this regard for the modification of the number of output bits estimated based on an amount of intermediate data generated for a data array to be modified based on a scaling factor assessment of the accuracy of the estimate for one (a single) previously encoded data array only. However, in an embodiment, a moving (e.g. weighted) average based on a latest set of a number of previously encoded data arrays is used.

In the present embodiments, the scaling factor A is initially set to a value of 1, but is then changed as data arrays are fully encoded and so a measure of the accuracy of the output bit count estimation process can be determined.

The above processes can straightforwardly be used to estimate an amount of bits in the output bitstream that would be used to encode a data array for which all of the intermediate data (a complete set of intermediate data) has been generated.

The present embodiments also use estimates of the number of bits in the output bitstream that will be used to encode a previous data array for data arrays for which only some but not all of the intermediate data has been generated (at the time that an output bit estimate is required for use when selecting a value of an encoding parameter to use when encoding an array of data elements).

In the present embodiments, this is done by estimating the number of output bits that will be generated for a data array y for which intermediate data has only been generated for a part, p, but not all, of that data array, based on an amount of intermediate data that has been generated for the preceding data array x.

In particular, the ratio of the amount of intermediate data that has been generated for the part of the data array y for which only part of the intermediate data has been generated to the amount of intermediate data that was generated for the corresponding part of the previous data array x for which all of the intermediate data has been generated, is used as a scaling factor to scale the estimated number of bits used in the output bitstream to encode the previous data array x for which a complete set of intermediate data has been generated, to thereby provide an estimate for the number of bits that will be used in the output bitstream to encode the later data array y for which only part of the intermediate data has been generated.

Thus:

$$B_{y,estim} = B_{x,estim} \cdot (M_{y;part}/M_{x;part})$$

where:

$B_{y,estim}$ is the estimated number of output bits for the data array y for which only some but not all of the intermediate data has been generated;

$B_{x;estim}$ is the estimated number of output bits for the earlier data array x for which all of the intermediate data has been generated (and was determined as $B_{x;estim} = A \cdot f(M_x)$);

$M_{y;part}$ is the amount of intermediate data that has been generated for the part of the data array for which only some but not all of the intermediate data has been generated; and $M_{x;part}$ is the amount of intermediate data that was generated for the corresponding part of the earlier data array x for which all of the intermediate data has been generated.

However, if the ratio of the amount of intermediate data generated for the part of the current data array y being considered to the amount of intermediate data generated for the corresponding part of the previous data array x for which all of the intermediate data has been generated (i.e. $M_{y;part}/M_{x;part}$) is too large (e.g. greater than 4), then the number of output bits for the later data array y is instead estimated by scaling up the amount of intermediate data generated for the part of the data array y that has been completed to provide an estimate of the intermediate data for that data array y as a whole, based on the portion (fraction) p of the data array y for which the existing intermediate data has been generated.

Thus:

$$B_{y,estim} = A \cdot f(M_{y;part}/p)$$

where:

$B_{y,estim}$ is the estimated number of output bits for the data array y for which only some but not all of the intermediate data has been generated;

$M_{y;part}$ is the amount of intermediate data that has been generated for the part of the data array y for which only some but not all of the intermediate data has been generated;

p is the portion (fraction) of the data array y for which intermediate data has been generated; and A is the estimation "error" scaling factor (as discussed above).

Once the actual and estimated numbers of output bits for the data arrays to be considered have been determined, they are used, together with the desired target output bit rate, to select 65 the value of the encoding parameter to use when encoding 61 a next data array to be encoded.

In the present embodiments, the encoding parameter value to use is selected (and set) at the beginning of the encoding of a new (and of each new) data array (with the selected encoding parameter value then being used for encoding the data array in question).

In the present embodiments, the encoding parameter whose value is selected based on the estimated/actual number(s) of bits used in the output bitstream for previous arrays of data elements and the target output bit rate comprises a quantization parameter for the encoding process (e.g., and in an embodiment, that sets the level of quantization that is applied to frequency domain coefficients representing difference values (residuals) between blocks of the data array being encoded and their corresponding reference blocks). Other encoding parameters could also or instead be used, if desired.

The encoding parameter value selection uses a predefined function that relates the value of the encoding parameter to a corresponding predicted output number of bits, which is then used to select the value of the encoding parameter accordingly. This function may be more or less sophisticated, as desired, and could be adapted in use, if desired.

Figure 7:
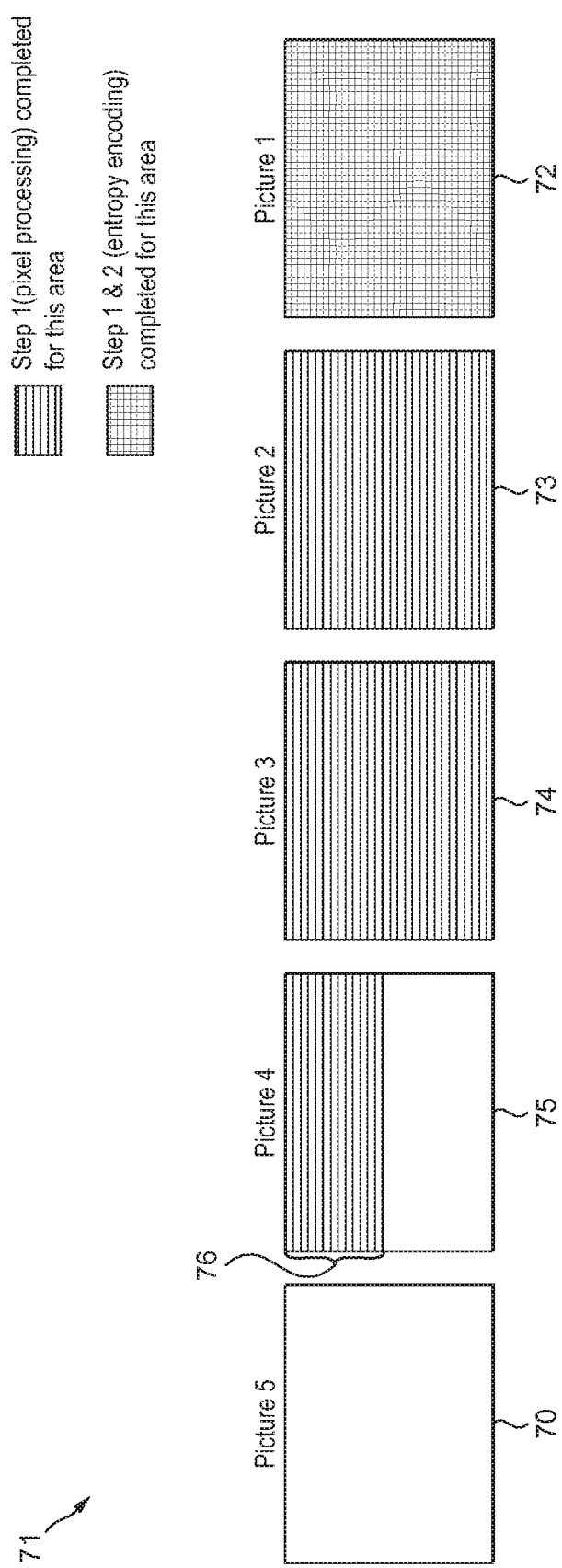
FIG. 7 illustrates an embodiment of an output bit rate control process when encoding a stream of data arrays that is in accordance with the technology described herein.

FIG. 7 shows in more detail an example of the output bit number estimating process of the present embodiments.

FIG. 7 shows the process at the point of starting the encoding of a fifth picture (frame) 70 in an exemplary stream 71 of five pictures (frames) being encoded.

In the example as shown in FIG. 7, it is assumed that when it is desired to select the encoding parameter (the quantization parameter) for the encoding process for the fifth picture 70, the number of bits included in the output bitstream for the first to fourth pictures in the stream 71 will be considered (used) by the rate control process.

As illustrated in FIG. 7, it is assumed in this example that the earliest picture (frame) 72 in the stream being encoded (in the encoding order) has at the time that the fifth picture 70 is to be encoded both undergone the data element processing to generate the intermediate data, and that that intermediate data has been entropy encoded to provide the output encoded bitstream for that first picture 72.

Thus, as shown in FIG. 7, for that first picture 72, both the amount of intermediate data $M_1$, and the actual number of bits $B_{1;act}$ included in the output bitstream are known. That being the case, the actual number of output bits $B_{1;act}$ for the first picture 72 can be used in the rate control process for the fifth picture 70.

Furthermore, the relative error between the estimate of the number of output bits $f(M_1)$ and the actual number of output bits $B_{1;act}$ for the first picture 72 can be used to determine an "error" scaling factor $$A_1 = B_{1;act}/f(M_1).$$

For the second picture 73 and the third picture 74 in the stream 71, it is assumed that the processing step to generate the intermediate data has been completed (such that an estimate of the amount of output bits $f(M_2)$, $f(M_3)$ can be determined), but that the entropy encoding has not been done, so the actual number of output bits for those pictures 73, 74 is not yet known.

Thus, for these pictures appropriate output bit estimates:

$$B_{2;estim} = A_1 \cdot f(M_2);$$

and $$B_{3;estim} = A_1 \cdot f(M_3)$$

are used in the rate control process for the fifth picture 70.

For the fourth picture, 75, it is assumed that the intermediate data has been generated, as shown in FIG. 7, for only a part 76 (a fraction), p, of that picture, so that an amount of intermediate data $M_{4;part}$ for some fraction p 76 of the fourth picture 75 is known.

Thus, the actual number of output bits for the fourth picture 75 is not yet known, and so an estimate of the number of bits that will be included in the output bitstream for the encoded version of the fourth picture 75 in the sequence is required.

As the intermediate data for only a part 76 of the fourth picture 75 has been generated at the time that the output bit estimate is required for that fourth picture 75, then the number of output bits for the fourth picture 75 is estimated either based on the amount of intermediate data that has been produced for the part p 76 of the fourth picture 75 that has been processed, namely as:

$$B_{4;estim} = A_1 \cdot f(M_{4;part}/p),$$

or based on the amount of intermediate data that has been produced for the part of the fourth picture 75 that has been processed and the amount of intermediate data that was produced for that corresponding part of the third picture 74 (for which all the intermediate data has been produced), namely as:

$$B_{4;estim} = B_{3;estim} \cdot M_{4;part}/M_{3;part}$$

where $B_{3;estim} = A_1 \cdot f(M_3)$.

In the present case, the second estimation process is used if the ratio of the intermediate data produced for the part 76 of the fourth picture 75 to the amount of intermediate data produced for the corresponding part of the third picture 74 ($M_{4;part}/M_{3;part}$) is less than a threshold value (which in the present embodiments is 4).

Other arrangements would, of course, be possible.

The rate control process for the fifth picture 70 then, e.g., could use the actual and estimated amount of bits for the preceding four pictures $B_{1;act}$, $B_{2;estim}$, $B_{3;estim}$, $B_{4;estim}$ to keep track of the current position ("fill level") of the output bit buffer that the output encoded bits are being drained from, and then set the quantization parameter for the encoding of the fifth picture 70 accordingly based on the current "fill" level of the buffer and the output bit rate at which the buffer is being "drained".

Other arrangements, such as the rate control process for the fifth picture 70, e.g., determining an average bit rate for the preceding four pictures as:

$$B_{aver} = (B_{1;act} + B_{2;estim} + B_{3;estim} + B_{4;estim})/4$$

and comparing that to a target output bit rate, $B_{tar}$, and setting the quantisation parameter for the encoding of the fifth picture 70 accordingly, would also be possible, if desired.

Various modifications, alternatives and additions to the above-described embodiments of the technology described herein will be possible, if desired.

For example, the value of the encoding parameter could be selected and set (and changed) more frequently than at the beginning of each data array that is being encoded, for example within a data array (during the encoding of a data array), if desired. This would provide finer grained bit rate control of the encoding process.

It would also, e.g., be possible to select the encoding parameter value based on estimated output bit rates only, if desired.

It would also be possible to treat (consider) the different types of intermediate data such as, for example, the motion vectors and differences (residual) data, separately when estimating the number of output bits that will be used to encode a data array. For example, the bit count estimating function f could be configured as:

$$f(M_{HDR}, M_{RES}) = M_{HDR} \times 10 \cdot M_{RES}^{0.9}$$

where $M_{HDR}$ is a measure of the amount of motion vector, header, intermediate data; and $M_{RES}$ is a measure of the amount of differences (residuals), "payload" intermediate data.

It would also correspondingly be possible to use different bit count estimation modification factors (e.g. scaling factors) for the different types of intermediate data that are being considered separately, if desired.

It can be seen from the above that the technology described herein, in its embodiments at least, can provide a more effective mechanism for performing output bit rate control when encoding a stream of data arrays, in particular in such arrangements where the data arrays may be encoded in a distributed fashion, using several encoding processors in parallel.

This is achieved, in the embodiments of the technology described herein at least, by using estimates of the number of output bits that will be generated for data arrays based on an amount of intermediate data that has been produced for those data arrays in the rate control process. This then allows the rate control operation to be based on more recent data arrays in the stream of data arrays that is being encoded, and so may therefore facilitate more accurate, and accordingly better, output bit rate control.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of encoding arrays of data elements of a stream of arrays of data elements, in which each array of data elements is encoded by generating a set of intermediate data representing the array of data elements and then encoding the set of intermediate data to provide an output bitstream representing the array of data elements in an encoded form, the method comprising:

when encoding an array of data elements to be encoded of a stream of arrays of data elements:
estimating a number of bits used in the output bitstream to encode a previous array of data elements in the stream of arrays of data elements being encoded, based on an amount of intermediate data generated for that previous array of data elements by the encoding process;
selecting a value of an encoding parameter to use when encoding the array of data elements to be encoded based on the estimated number of bits used in the output bitstream to encode the previous array of data elements and a target output bit rate for the output bitstream produced when encoding the stream of arrays of data elements; and
encoding the array of data elements to be encoded using the selected value of the encoding parameter;
wherein:
estimating a number of bits used in the output bitstream to encode a previous array of data elements in the stream of arrays of data elements being encoded, based on an amount of intermediate data generated for that previous array of data elements by the encoding process comprises:
estimating a number of bits used in the output bitstream based on an amount of intermediate data for a previous array of data elements for which intermediate data has been generated for only a part of that data array, by estimating the number of bits to be used in the output bitstream to encode the previous data array for which intermediate data has been generated for only a part of that data array based on the amount of intermediate data generated for the part of the previous data array for which intermediate data has been generated for only a part of that data array, and an amount of intermediate data generated for the corresponding part of another data array for which intermediate data for all of that another data array has been generated, and an estimate of the number of bits used in the output bitstream to encode the another data array for which all of the intermediate data has been generated, only when a difference between the amount of intermediate data generated for the part of the previous data array, and an amount of intermediate data generated for a corresponding part of another data array for which all of the intermediate data has been generated is less than a threshold difference;
and
estimating a number of bits used in the output bitstream based on an amount of intermediate data for a previous array of data elements for which intermediate data has been generated for only a part of that data array, by estimating a total amount of intermediate data that will be generated for the previous data array for which intermediate data has been generated for only a part of that data array based on the amount of intermediate data generated for the part of that previous data array for which intermediate data has been generated and using the estimated total amount of intermediate data to estimate the number of bits used in the output bitstream to encode that previous data array for which intermediate data has been generated for only a part of that data array, when a difference between the amount of intermediate data generated for the part of the previous data array, and the amount of intermediate data generated for the corresponding part of the another data array for which all of the intermediate data has been generated is not less than the threshold difference.

2. The method of claim 1, comprising:
estimating a number of bits used in the output bitstream based on an amount of intermediate data for each of a plurality of previous arrays of data elements; and
selecting the value of an encoding parameter to use when encoding the array of data elements to be encoded based on the estimated numbers of bits used in the output bitstream for the plural previous arrays of data elements and the target output bit rate for the output bitstream.

3. The method of claim 1, comprising:
estimating a number of bits used in the output bitstream based on an amount of intermediate data for a previous array of data elements by:
estimating the number of bits in the output bitstream that will be used to encode the previous array of data elements based on an amount of intermediate data generated for that previous array of data elements by the encoding process; and
then modifying the estimate of the number of bits in the output bitstream that will be used to encode the previous array of data elements that was determined based on an amount of intermediate data generated for that previous array of data elements by the encoding process using an estimation modification factor that is based on a comparison of the actual number of bits used in the output bitstream to encode another array of data elements in the stream of arrays of data elements to an estimated number of output bits in the output bitstream to be used to encode that another array of data elements that was determined for that another array of data elements based on an amount of intermediate data generated for that another array of data elements.

4. The method of claim 1, comprising:
estimating a number of bits used in the output bitstream based on an amount of intermediate data for a previous array of data elements for which intermediate data has been generated for only a part of that data array, by:
estimating the number of bits to be used in the output bitstream to encode the previous data array for which intermediate data has been generated for only a part of that data array based on the amount of intermediate data generated for the part of the previous data array for which intermediate data has been generated for only a part of that data array, and an amount of intermediate data generated for the corresponding part of another data array for which intermediate data for all of that another data array has been generated, and an estimate of the number of bits used in the output bitstream to encode the another data array for which all of the intermediate data has been generated.

5. The method of claim 1, comprising:
estimating a number of bits used in the output bitstream based on an amount of intermediate data for a previous array of data elements for which intermediate data has been generated for only a part of that data array, by:

estimating a total amount of intermediate data that will be generated for the previous data array for which intermediate data has been generated for only a part of that data array based on the amount of intermediate data generated for the part of that previous data array for which intermediate data has been generated; and using the estimated total amount of intermediate data to estimate the number of bits used in the output bitstream to encode that previous data array for which intermediate data has been generated for only a part of that data array.

6. The method of claim 1, comprising:

estimating the number of bits used in the output bitstream to encode a previous array of data elements based on an amount of intermediate data generated for that previous array of data elements by the encoding process using a non-linear function that relates the amount of intermediate data to a number of bits that would be used in the output bitstream to encode that amount of intermediate data.

7. The method of claim 1, wherein the encoding parameter whose value is selected based on the number of bits used in the output bitstream to encode a previous array or arrays of data elements and the target output bit rate is a parameter that affects the quality of the data array as it will be reproduced when decoding the encoded data array.

8. The method of claim 1, further comprising:

determining respective, separate, amounts of intermediate data that have been generated by the encoding process for each of plural different types of intermediate data for a previous data array, and then using those separate, respective intermediate data type amounts when estimating the number of output bits that will be used to encode the previous data array.

9. The method of claim 1, comprising:

selecting the value of the encoding parameter to use during the encoding of the data array.

10. The method of claim 1, wherein the stream of arrays of data elements comprises a stream of video frames to be encoded.

11. An apparatus for encoding arrays of data elements of a stream of arrays of data elements, the apparatus comprising:

encoding circuitry operable to encode an array of data elements by generating a set of intermediate data representing the array of data elements, and then encoding the set of intermediate data to provide an output bitstream representing the array of data elements in an encoded form;

the apparatus further comprising output bitstream rate control circuitry comprising:

bit number estimating circuitry operable to estimate a number of bits used in an output bitstream to encode a previous array of data elements in a stream of arrays of data elements being encoded, based on an amount of intermediate data generated for that previous array of data elements by the encoding circuitry;

and encoding parameter selecting circuitry operable to:

select a value of an encoding parameter to use when encoding an array of data elements to be encoded based on an estimated number of bits used in the output bitstream to encode a previous array of data elements estimated by the bit number estimating circuitry and a target output bit rate for an output bitstream produced when encoding a stream of arrays of data elements; and to cause the encoding circuitry to encode an array of data elements to be encoded using the selected value of the encoding parameter;

wherein:

the bit number estimating circuitry is configured to:

estimate a number of bits used in the output bitstream based on an amount of intermediate data for a previous array of data elements for which intermediate data has been generated for only a part of that data array, by estimating the number of bits to be used in the output bitstream to encode the previous data array for which intermediate data has been generated for only a part of that data array based on the amount of intermediate data generated for the part of the previous data array for which intermediate data has been generated for only a part of that data array, and an amount of intermediate data generated for the corresponding part of another data array for which intermediate data for all of that another data array has been generated, and an estimate of the number of bits used in the output bitstream to encode the another data array for which all of the intermediate data has been generated, only when a difference between the amount of intermediate data generated for the part of the previous data array, and an amount of intermediate data generated for a corresponding part of another data array for which all of the intermediate data has been generated is less than a threshold difference;

and estimate a number of bits used in the output bitstream based on an amount of intermediate data for a previous array of data elements for which intermediate data has been generated for only a part of that data array, by estimating a total amount of intermediate data that will be generated for the previous data array for which intermediate data has been generated for only a part of that data array based on the amount of intermediate data generated for the part of that previous data array for which intermediate data has been generated and using the estimated total amount of intermediate data to estimate the number of bits used in the output bitstream to encode that previous data array for which intermediate data has been generated for only a part of that data array, when a difference between the amount of intermediate data generated for the part of the previous data array, and the amount of intermediate data generated for the corresponding part of the another data array for which all of the intermediate data has been generated is not less than the threshold difference.

12. The apparatus of claim 11, wherein:

the bit number estimating circuitry is operable to estimate a number of bits used in the output bitstream based on an amount of intermediate data for each of a plurality of previous arrays of data elements; and the encoding parameter selecting circuitry is operable to select the value of an encoding parameter to use when encoding the array of data elements to be encoded based on estimated numbers of bits used in the output bitstream for plural previous arrays of data elements and the target output bit rate for the output bitstream.

13. The apparatus of claim 11, wherein:

the bit number estimating circuitry is operable to estimate a number of bits used in the output bitstream based on an amount of intermediate data for a previous array of data elements by:

estimating the number of bits in the output bitstream that will be used to encode the previous array of data elements based on an amount of intermediate data generated for that previous array of data elements by the encoding process; and then modifying the estimate of the number of bits in the output bitstream that will be used to encode the a previous array of data elements that was determined based on an amount of intermediate data generated for that previous array of data elements by the encoding process using an estimation modification factor that is based on a comparison of the actual number of bits used in the output bitstream to encode another array of data elements in the stream of arrays of data elements to an estimated number of output bits in the output bitstream to be used to encode that another array of data elements that was determined for that another array of data elements based on an amount of intermediate data generated for that another array of data elements.

14. The apparatus of claim 11, wherein:

the bit number estimating circuitry is operable to estimate a number of bits used in the output bitstream based on an amount of intermediate data for a previous array of data elements for which intermediate data has been generated for only a part of that data array, by:

estimating the number of bits to be used in the output bitstream to encode the previous data array for which intermediate data has been generated for only a part of that data array based on the amount of intermediate data generated for the part of the previous data array for which intermediate data has been generated for only a part of that data array, and an amount of intermediate data generated for the corresponding part of another data array for which intermediate data for all of that another data array has been generated, and an estimate of the number of bits used in the output bitstream to encode the another data array for which all of the intermediate data has been generated.

15. The apparatus of claim 11, wherein:

the bit number estimating circuitry is operable to estimate a number of bits used in the output bitstream based on an amount of intermediate data for a previous array of data elements for which intermediate data has been generated for only a part of that data array, by:

estimating a total amount of intermediate data that will be generated for the previous data array for which intermediate data has been generated for only a part of that data array based on the amount of intermediate data generated for the part of that previous data array for which intermediate data has been generated; and using the estimated total amount of intermediate data to estimate the number of bits used in the output bitstream to encode that previous data array for which intermediate data has been generated for only a part of that data array.

16. The apparatus of claim 11, wherein:

the bit number estimating circuitry is operable to estimate the number of bits used in the output bitstream to encode a previous array of data elements based on an amount of intermediate data generated for that previous array of data elements by the encoding process using a non-linear function that relates the amount of intermediate data to a number of bits that would be used in the output bitstream to encode that amount of intermediate data.

17. The apparatus of claim 11, wherein the encoding parameter whose value is selected based on the number of bits used in the output bitstream to encode a previous array or arrays of data elements and the target output bit rate is a parameter that affects the quality of the data array as it will be reproduced when decoding the encoded data array.

18. The apparatus of claim 11, wherein:

the bit number estimating circuitry is operable to consider respective, separate, amounts of intermediate data that have been generated by the encoding process for each of plural different types of intermediate data for a previous data array, and use those separate, respective intermediate data type amounts when estimating the number of output bits that will be used to encode a previous data array.

19. The apparatus of claim 11, wherein:

the encoding parameter selecting circuitry is operable to select the value of the encoding parameter to use during the encoding of a data array.

20. The apparatus of claim 11, wherein the apparatus is part of a video encoder.

21. A computer readable storage medium storing computer software code which when executing on a processor performs a method of encoding arrays of data elements of a stream of arrays of data elements, in which each array of data elements is encoded by generating a set of intermediate data representing the array of data elements and then encoding the set of intermediate data to provide an output bitstream representing the array of data elements in an encoded form, the method comprising:

when encoding an array of data elements to be encoded of a stream of arrays of data elements:

estimating a number of bits used in the output bitstream to encode a previous array of data elements in the stream of arrays of data elements being encoded, based on an amount of intermediate data generated for that previous array of data elements by the encoding process;

selecting a value of an encoding parameter to use when encoding the array of data elements to be encoded based on the estimated number of bits used in the output bitstream to encode the previous array of data elements and a target output bit rate for the output bitstream produced when encoding the stream of arrays of data elements; and encoding the array of data elements to be encoded using the selected value of the encoding parameter;

wherein:

estimating a number of bits used in the output bitstream to encode a previous array of data elements in the stream of arrays of data elements being encoded, based on an amount of intermediate data generated for that previous array of data elements by the encoding process comprises:

estimating a number of bits used in the output bitstream based on an amount of intermediate data for a previous array of data elements for which intermediate data has been generated for only a part of that data array, by estimating the number of bits to be used in the output bitstream to encode the previous data array for which intermediate data has been generated for only a part of that data array based on the amount of intermediate data generated for the part of the previous data array for which intermediate data has been generated for only a part of that data array, and an amount of intermediate data generated for the corresponding part of another data array for which intermediate data for all of that another data array has been generated, and an estimate of the number of bits used in the output bitstream to encode the another data array for which all of the intermediate data has been generated, only when a difference between the amount of intermediate data generated for the part of the previous data array, and an amount of intermediate data generated for a corresponding part of another data array for which all of the intermediate data has been generated is less than a threshold difference;
and
estimating a number of bits used in the output bitstream based on an amount of intermediate data for a previous array of data elements for which intermediate data has been generated for only a part of that data array, by estimating a total amount of intermediate data that will be generated for the previous data array for which intermediate data has been generated for only a part of that data array based on the amount of intermediate data generated for the part of that previous data array for which intermediate data has been generated and using the estimated total amount of intermediate data to estimate the number of bits used in the output bitstream to encode that previous data array for which intermediate data has been generated for only a part of that data array, when a difference between the amount of intermediate data generated for the part of the previous data array, and the amount of intermediate data generated for the corresponding part of the another data array for which all of the intermediate data has been generated is not less than the threshold difference.

* * * * *